United States Patent
Moniz

(10) Patent No.: US 10,482,885 B1
(45) Date of Patent: Nov. 19, 2019

(54) SPEAKER BASED ANAPHORA RESOLUTION

(71) Applicant: Amazon Technologies, Inc., Seattle, WA (US)

(72) Inventor: Michael Moniz, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/352,237

(22) Filed: Nov. 15, 2016

(51) Int. Cl.
*G10L 21/00* (2013.01)
*G10L 17/06* (2013.01)
*G10L 25/87* (2013.01)
*G06F 17/27* (2006.01)

(52) U.S. Cl.
CPC ............ *G10L 17/06* (2013.01); *G06F 17/278* (2013.01); *G10L 25/87* (2013.01)

(58) Field of Classification Search
CPC ......... G10L 15/22; G10L 17/00; G10L 17/27; G10L 15/26; G10L 2015/088; G10L 17/005; G10L 15/00; G10L 15/07; G10L 2015/227; G10L 21/0202
See application file for complete search history.

(56) References Cited

U.S. PATENT DOCUMENTS

| | | | | |
|---|---|---|---|---|
| 6,532,444 B1* | 3/2003 | Weber | ................ | G06F 17/27 704/257 |
| 8,832,213 B2* | 9/2014 | Heron | ................ | H04L 51/04 709/206 |
| 9,529,793 B1* | 12/2016 | Taubman | ................ | G06F 17/274 704/9 |
| 2010/0324896 A1* | 12/2010 | Attwater | ................ | G10L 15/08 704/238 |
| 2014/0142934 A1* | 5/2014 | Kim | ................ | G10L 15/20 704/226 |
| 2014/0222436 A1* | 8/2014 | Binder | ................ | G06F 3/167 704/275 |
| 2015/0149182 A1* | 5/2015 | Kalns | ................ | G10L 15/18 704/275 |
| 2015/0229708 A1* | 8/2015 | Han | ................ | H04L 12/1827 709/225 |
| 2015/0356136 A1* | 12/2015 | Joshi | ................ | G06F 17/30424 |
| 2016/0313868 A1* | 10/2016 | Weng | ................ | G06F 3/017 |
| 2017/0278514 A1* | 9/2017 | Mathias | ................ | G10L 15/22 |

\* cited by examiner

*Primary Examiner* — Huyen X Vo
(74) *Attorney, Agent, or Firm* — Pierce Atwood LLP

(57) ABSTRACT

A speech-processing system configured to determine entities corresponding to ambiguous words such as anaphora ("he," "she," "they," etc.) included in an utterance. The system may associate incoming utterances with a speaker identification (ID), device ID, and other data. The system then tracks entities referred to in utterances so that if a later utterance includes an ambiguous entity reference, the system may take the speaker ID, device ID, etc. from the ambiguous reference, along with the text of the utterance and other data, and compare that information to previously mentioned entities (or other entities that may be relevant) to identify the entity mentioned in the ambiguous statement. Once the entity is determined, the system may then complete command processing of the utterance using the identified entity.

19 Claims, 16 Drawing Sheets

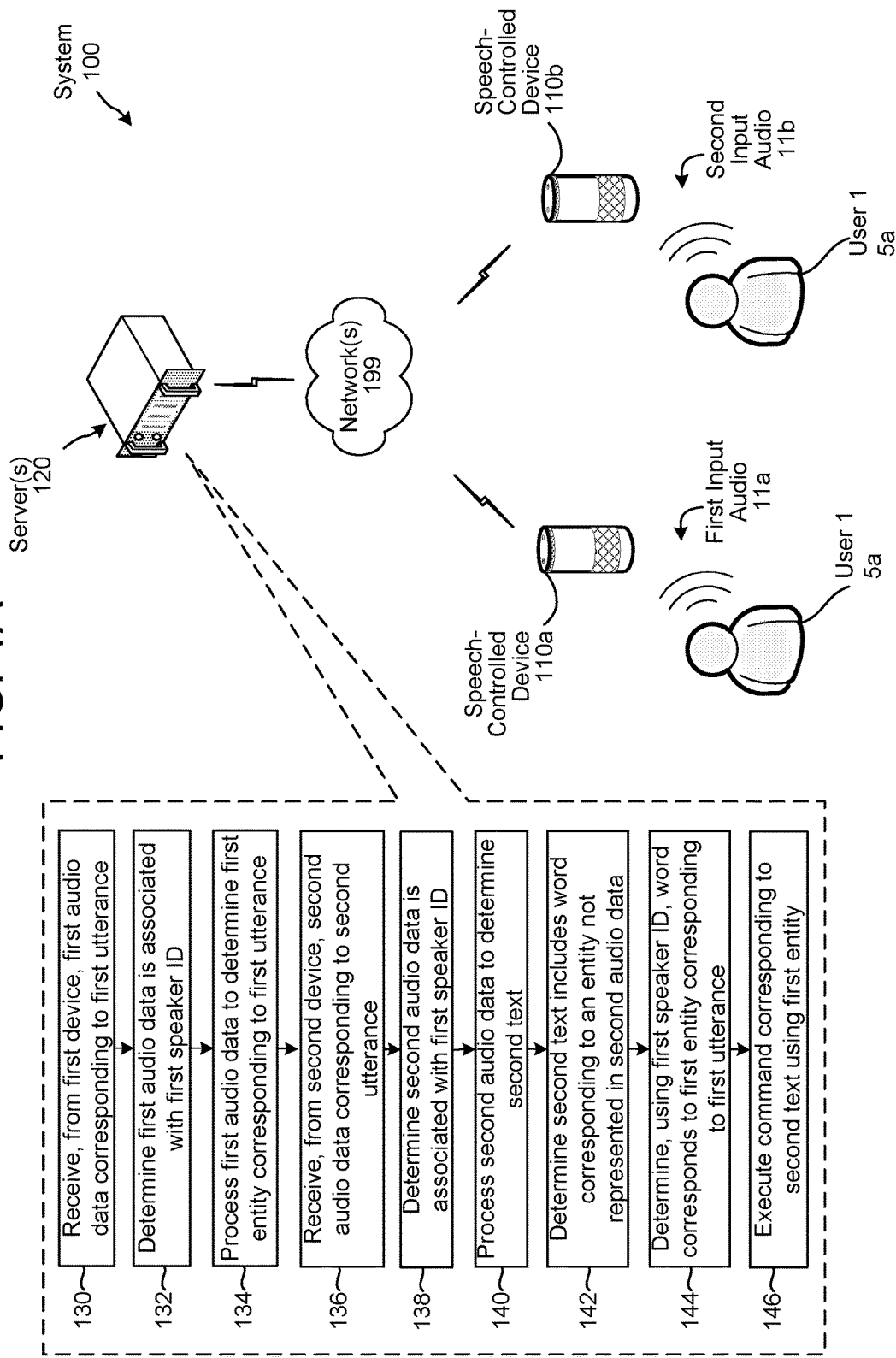

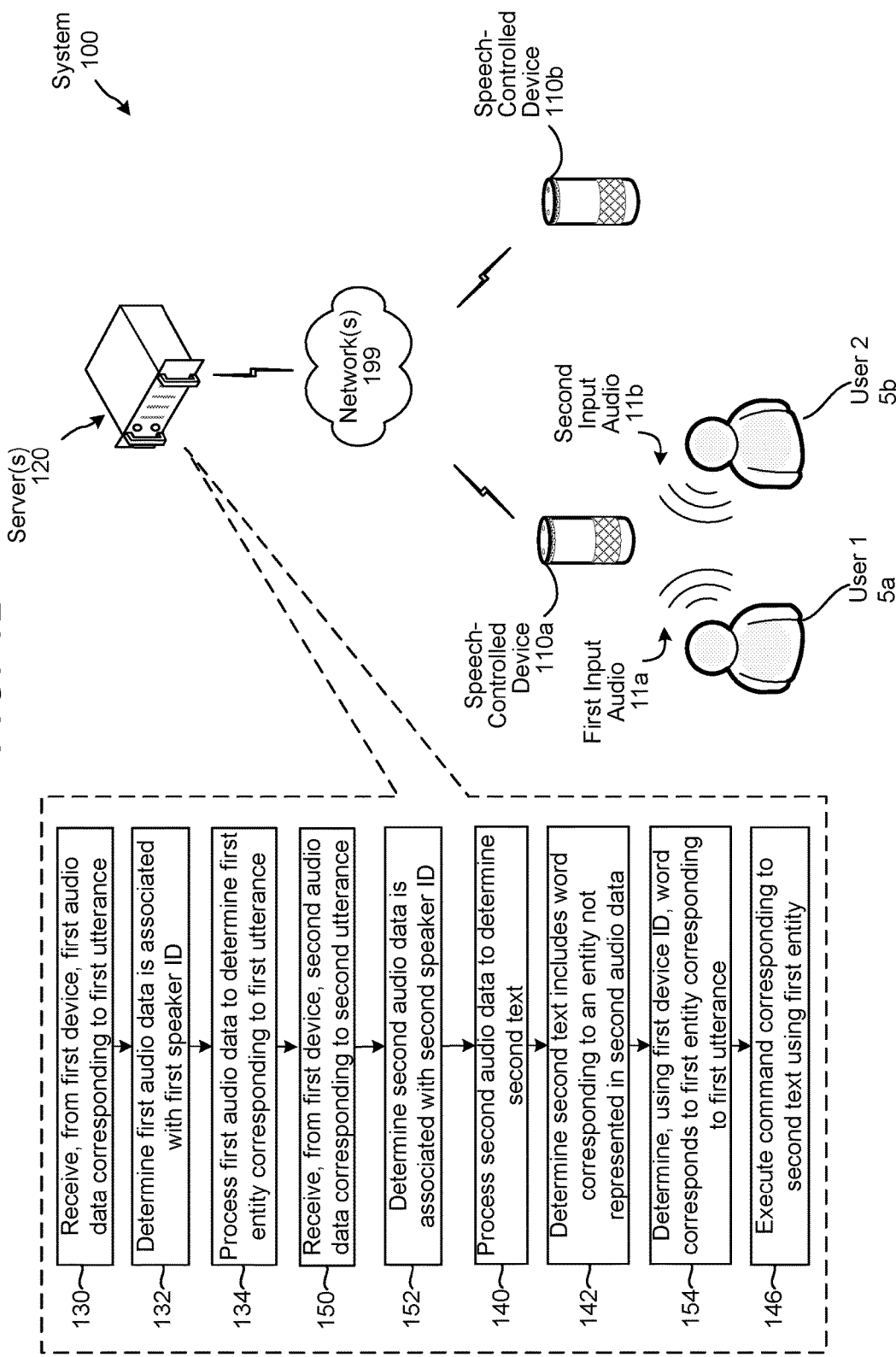

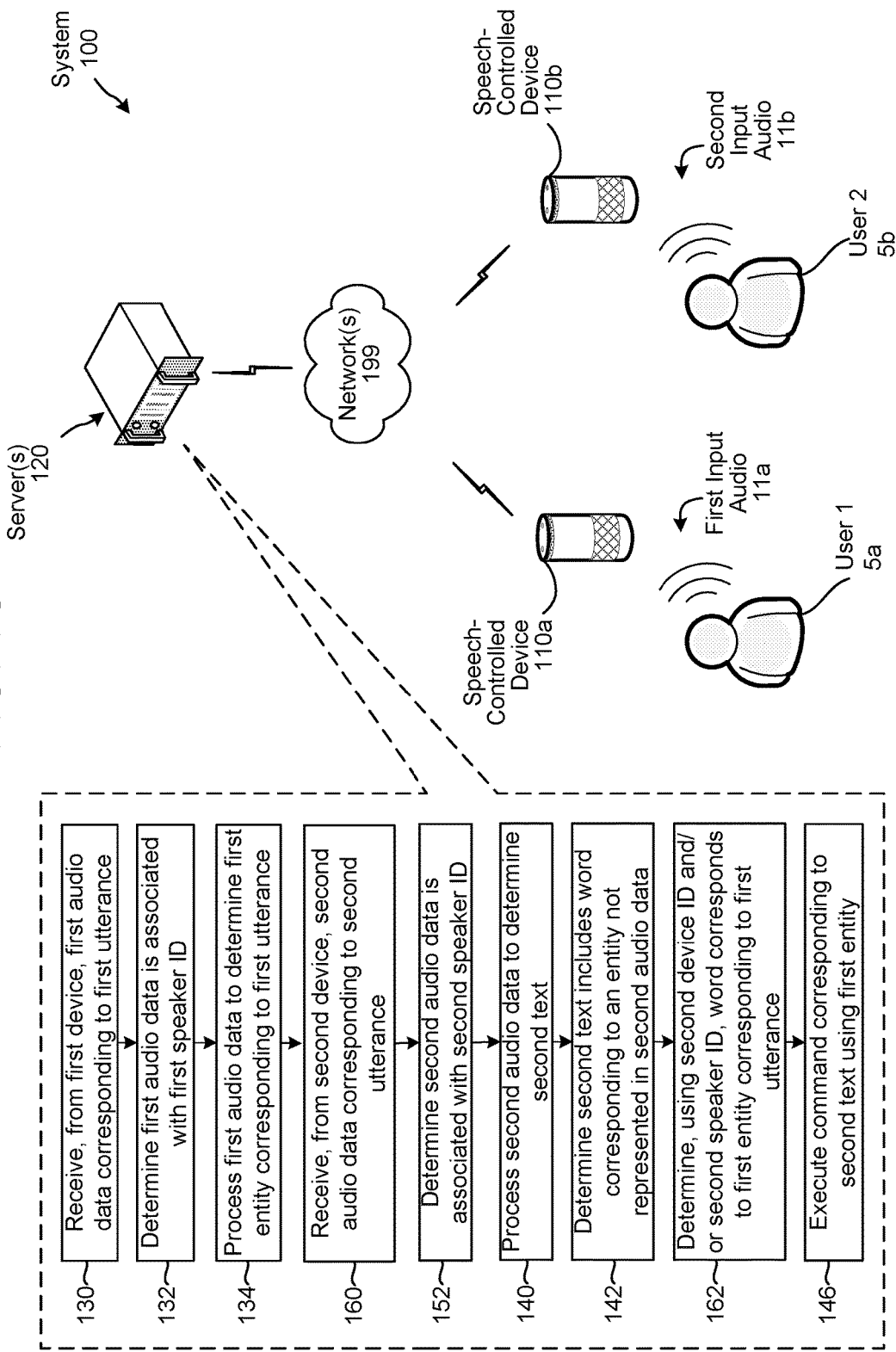

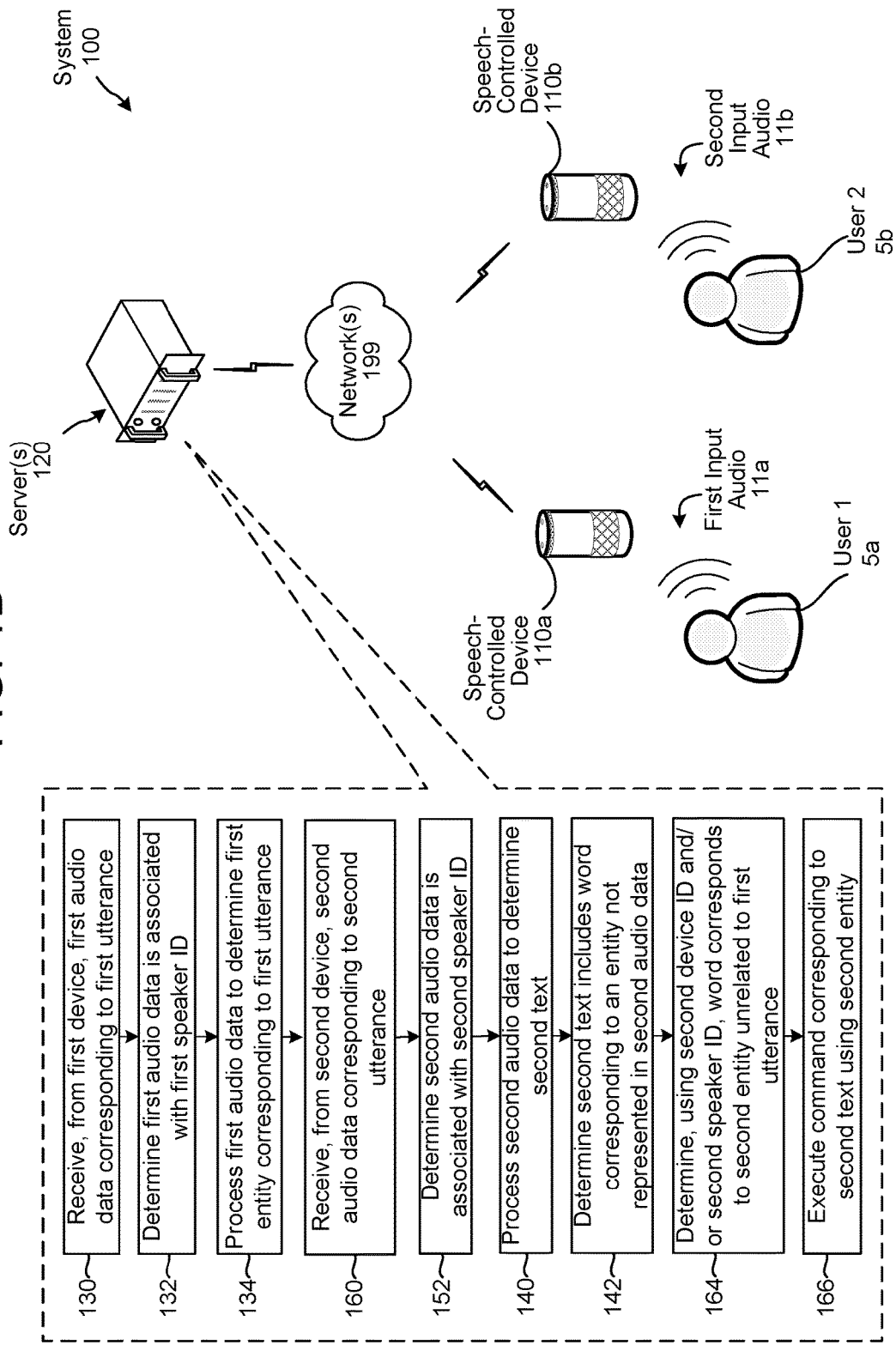

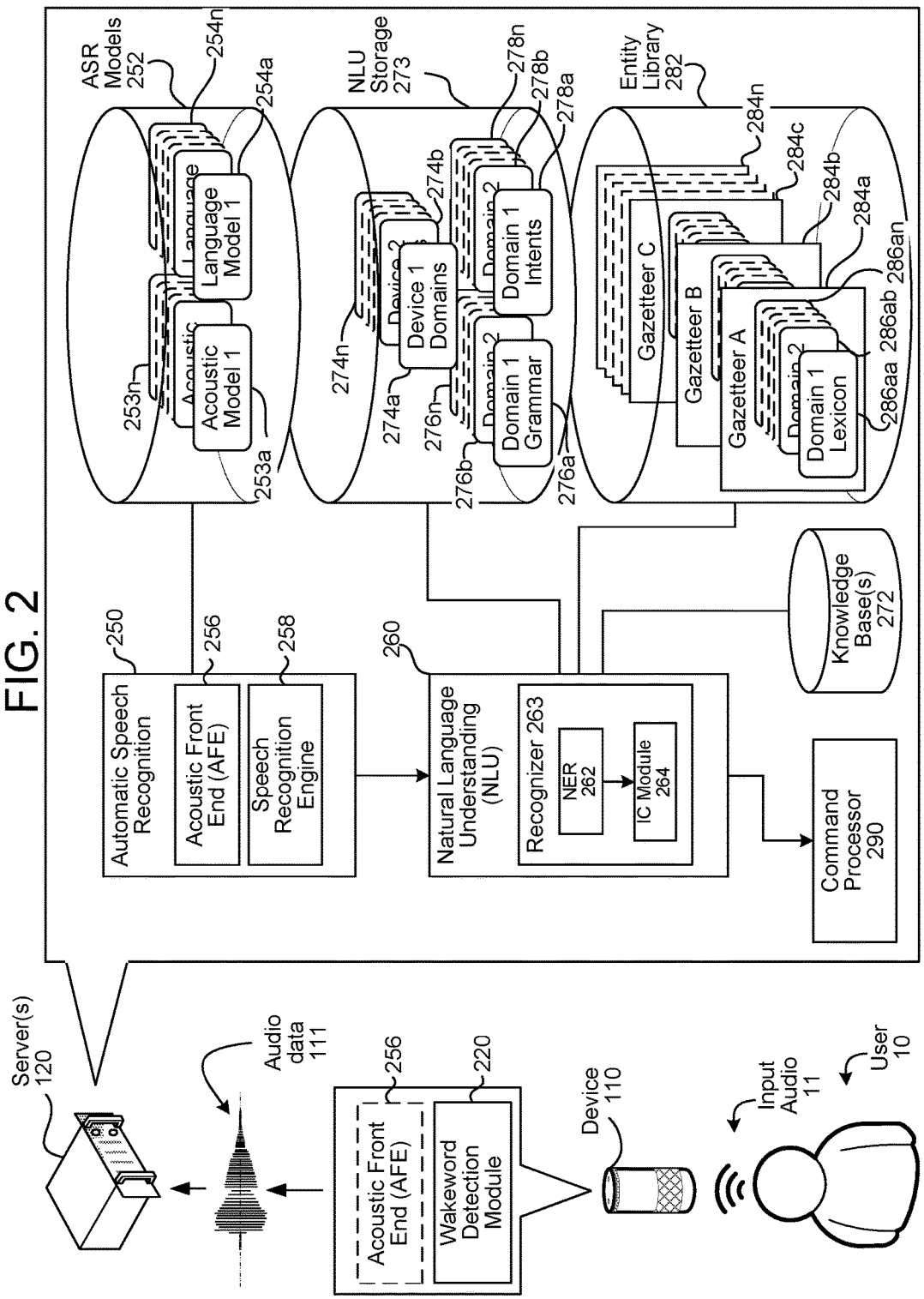

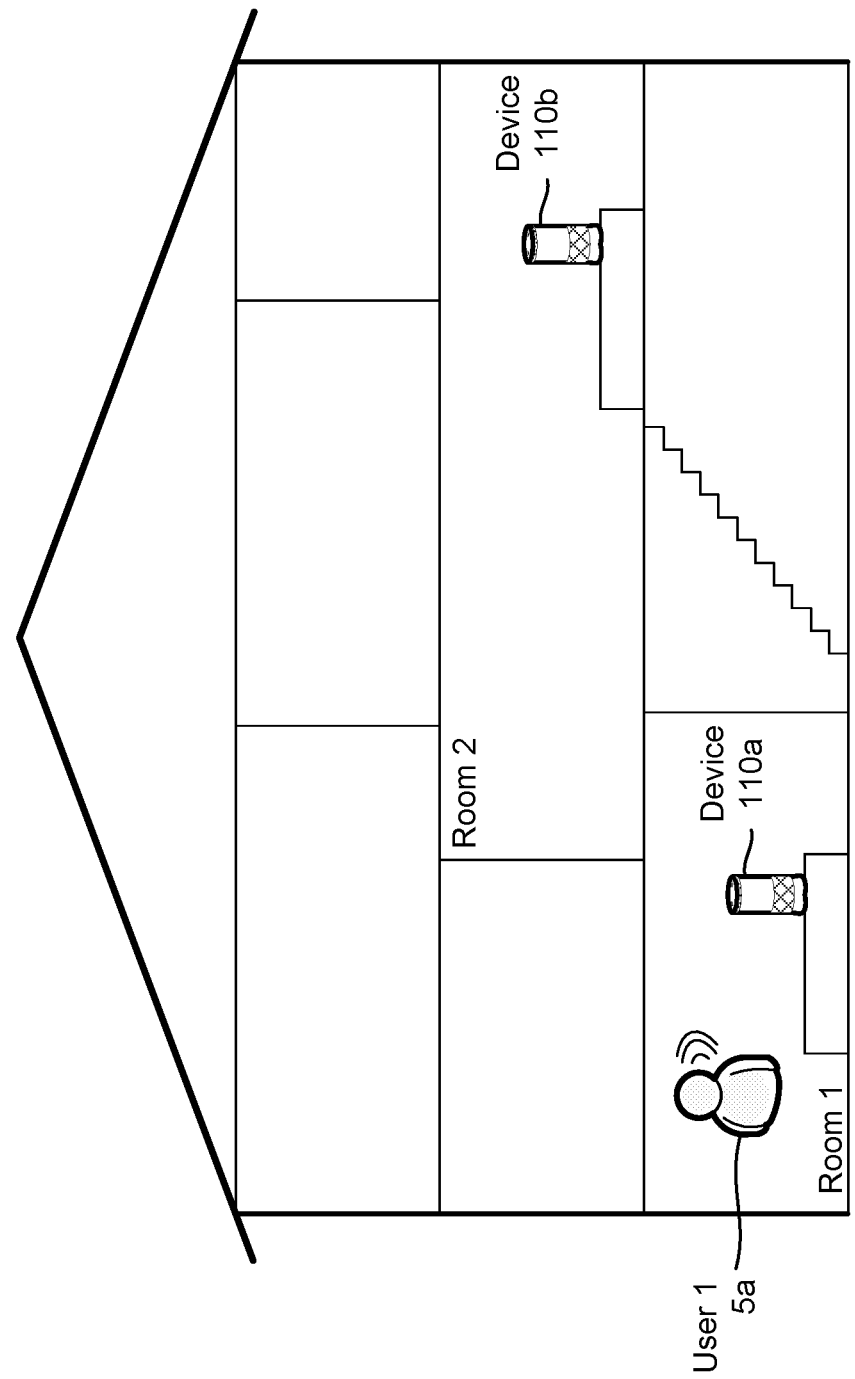

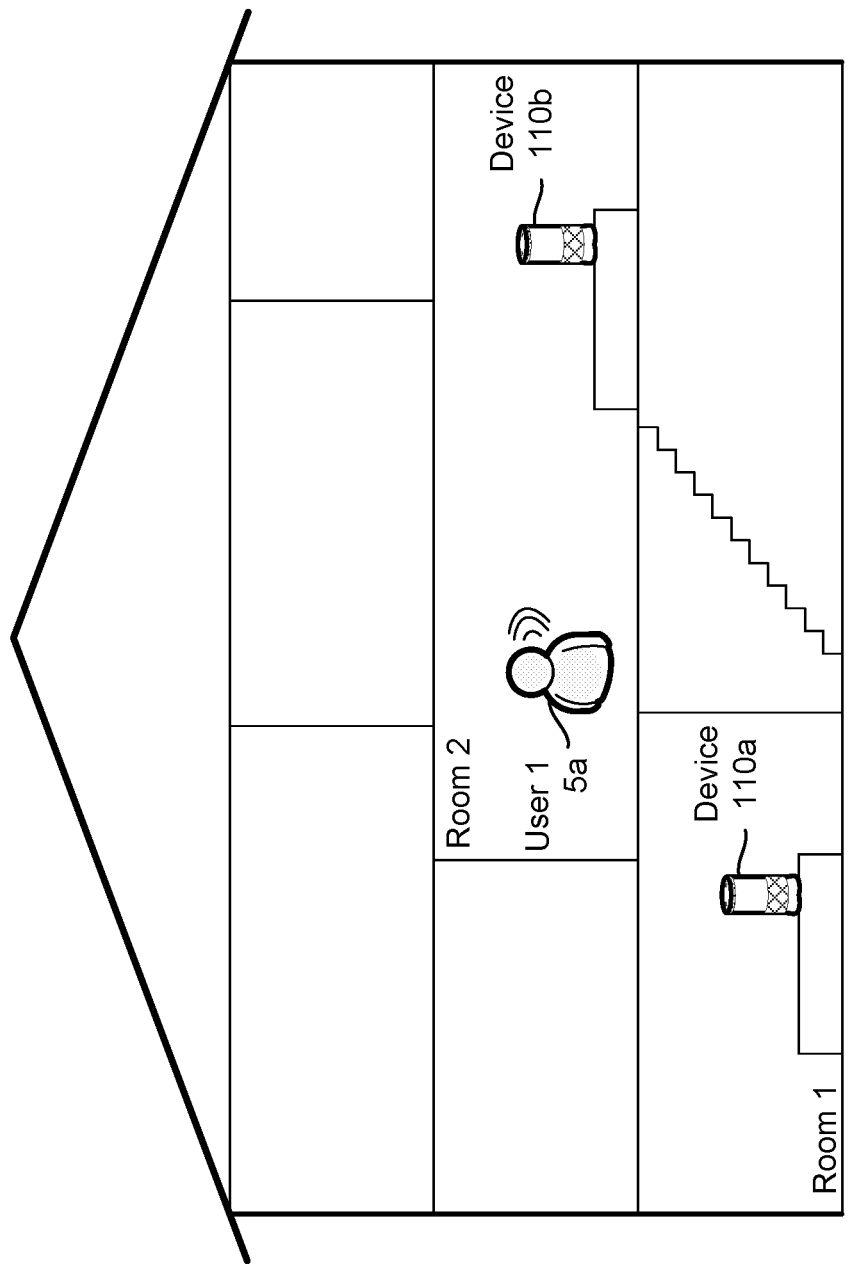

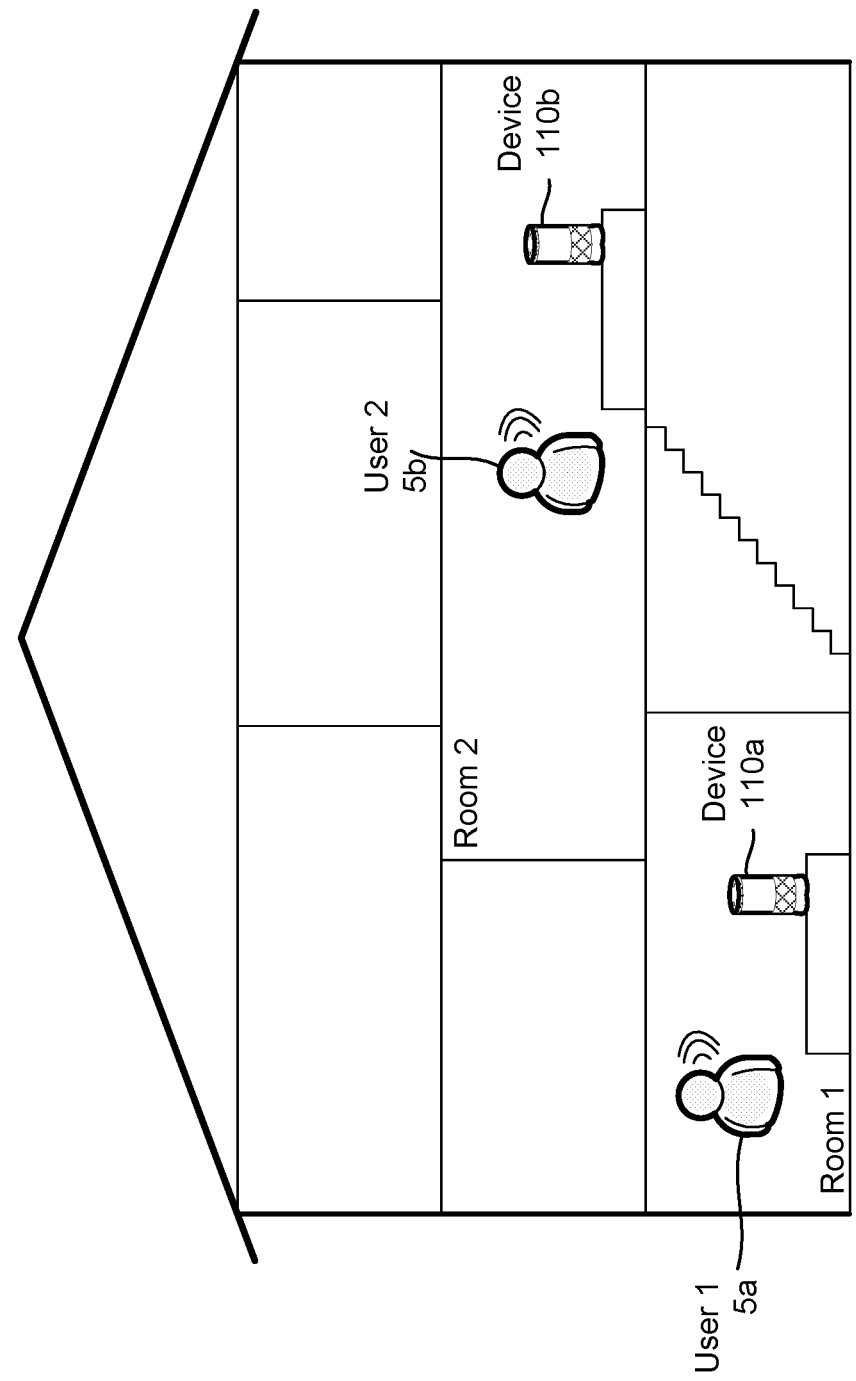

FIG. 6

Context Data
604

| Device | Speaker | Entities discussed | Time | Entities Spoken By |
|---|---|---|---|---|
| Echo 1 | Joe | Weird Al | -0:00:02:31 | User |
| Echo 1 | Mary | Barack Obama | -0:00:12:04 | System |
| Echo 1 | Joe | Starbucks 5438 | -0:02:05:06 | System |
| Echo 2 | Joe | Canada, United States | -0:04:12:58 | User |
| Echo 1 | Lily | Finding Nemo Film | -1:01:30:07 | User |
| Dot 1 | Lily | Nemo - character | -1:01:32:11 | System |

SPEAKER BASED ANAPHORA RESOLUTION

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. The combination of speech recognition and natural language understanding processing techniques is referred to herein as speech processing. Speech processing may also involve converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIGS. 1A-1D illustrate a speech processing system configured to resolve anaphora based on a speaker identification according to embodiments of the present disclosure.

FIG. 2 is a conceptual diagram of how a spoken utterance may be processed according to embodiments of the present disclosure.

FIGS. 5A-5D illustrate a configuration of devices of the system according to embodiments of the present disclosure.

FIG. 6 illustrates conversation context data that may be used to resolve anaphora based on a speaker identification according to embodiments of the present disclosure.

DETAILED DESCRIPTION

Figure 3:
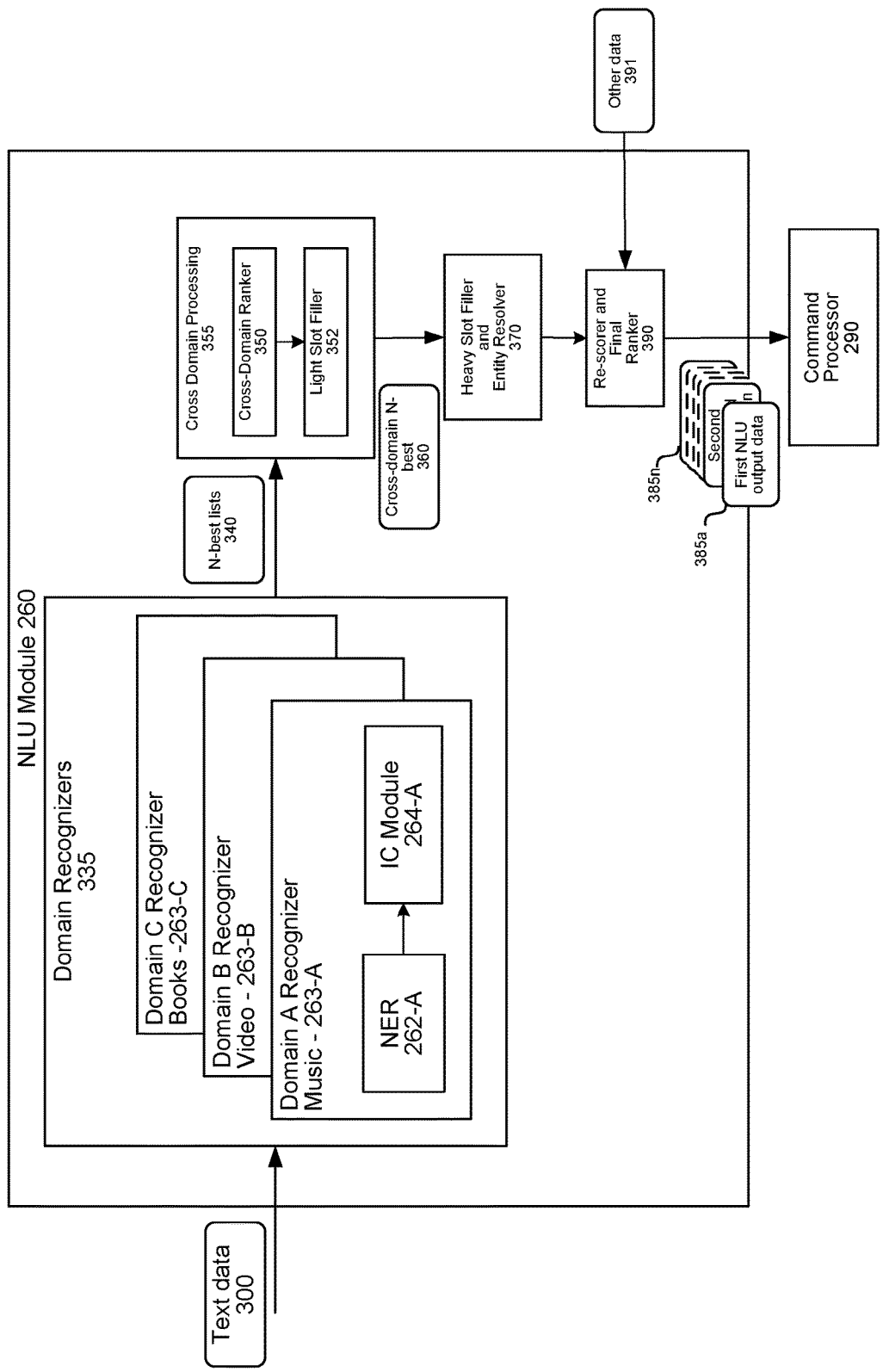
FIG. 3 is a conceptual diagram of a system architecture for parsing incoming utterances using multiple domains according to embodiments of the present disclosure.

Automatic speech recognition (ASR) is a field of computer science, artificial intelligence, and linguistics concerned with transforming audio data associated with speech into text data representative of that speech. Similarly, natural language understanding (NLU) is a field of computer science, artificial intelligence, and linguistics concerned with enabling computers to derive meaning from text input containing natural language. ASR and NLU are often used together as part of a speech processing system. Thus a spoken language processing system may include an ASR module that receives audio input of a user utterance and generates one or more likely transcriptions of the utterance and may also include a NLU module that receives textual input, such as a transcription of a user utterance, and determines the meaning of the text in a way that can be acted upon, such as by a computer application.

A speech processing system may be configured as a relatively self-contained system where one device captures audio, performs speech processing, and executes a command corresponding to the input speech. Alternatively, a speech processing system may be configured as a distributed system where a number of different devices combine to capture audio of a spoken utterance, perform speech processing, and execute a command corresponding to the utterance. Although the present application describes a distributed system, the teachings of the present application may apply to any system configuration.

Depending on system configuration, a speech processing system may be capable of executing a number of different commands such as playing music, answering queries using an information source, opening communication connections, sending messages, shopping, etc. As part of an exchange between a user and the system, input and/or output data may refer to a particular entity such as person, place, media item, etc. An entity is a person, place, thing, etc. that has an identity. If an utterance mentions a specific entity, in order to perform the action desired by an utterance the system may need to identify the entity (or entities) mentioned in the utterance. For example, if the utterance includes a command to "play Piano Man by Billy Joel" the system needs to recognize the particular song entity referred to by the utterance in order to execute the command. In other situations, the utterance may require the system to identify a particular entity in response to the utterance. For example, if the utterance includes a query such as "where is the nearest Starbucks" the system needs to identify the nearest Starbucks as the entity in order to respond to the query.

While interacting with the system, the user may refer to an entity involved in a previous exchange in a manner that is not explicit. For example, after the system answers the Starbucks query with the location of the nearest Starbucks, the user may wish to know the hours for that Starbucks and may ask the system "how late are they open?" Even though the user did not explicitly state what "they" refers to, the system may expect the system to provide the hours (or the closing time) of the Starbucks that was just part of an exchange between the user and the system. In another example, after asking the system to "play Piano Man by Billy Joel" the user may ask the system "when did he write that?" In order to answer the second query, the system must understand that "he" refers to Billy Joel and "that" refers to the song Piano Man. Words that refer to an entity but do not explicitly name the entity are an example of anaphora, namely a word referring to or replacing another word. Other references to other text may also be processed by the system. For example, exophora is a reference in text to something external to the text, endophora is a reference to something preceding or following the reference within the text, and cataphora is a reference to a following word or group or words. The system may be configured to process these, and other similar types of references (which may generally be referred to below as anaphora). Further, while a language such as English may use unknown words to substitute for anaphora/(e.g., pronouns), other languages, such as Japanese may allow phrasing of anaphora without a specific word to represent the anaphora (referred to as zero-phrase anaphora), and other languages may use other forms of reference. The present system may be used to resolve many such forms of anaphora across many different languages.

An interaction between a user and a spoken language processing system may be referred to as a dialog. The dialog may involve one or more user utterances, such as the above queries, associated with a particular task (e.g., one or more user utterances and optional system responses during which a user requests information or gives a command, and the spoken language processing system executes the command, requests more information, or provides the requested information). A "conversation" may be one or more dialogs relating to the same user task or involving execution of the same application or function. The dialogs of a conversation may be separated in time by periods during which no dialog occurs.

The speech processing system may receive and/or store contextual information related to a conversation. This contextual information may be used to resolve anaphora within a given conversation. The contextual information may include a map of words spoken by a user, words spoken to the user, or some subset thereof, for a given dialog or for the conversation as a whole. The context may be used later in the conversation to resolve anaphora. In one example, if a user first asks the system to "Book a flight to Chicago," and later says "When is the next flight there?" the contextual information related to the conversation may be used to help determine that "there" refers to "Chicago."

The response generator may additionally receive and/or store contextual information and location information related to the environment in which the dialog is taking place. For example, the contextual information and location information can reference media content being played and/or displayed to the user by the client device at the time the user initiates the dialog with the client device. This information may be used to resolve exophora in a given conversation. For example, a user may be watching a film (on either a same or different device from the device that captures the user's utterance). The user may query, "Who is that?" or "What does that mean?" while watching the film. The system may receive contextual information and location information related to the user's environment. In this case, the contextual information and location information may relate to the currently playing film. The location information may include, e.g., playback location information, such as the current timepoint of the media content, the current location or scene, etc. The contextual information may include, e.g., characters, locations, specific words, or objects mentioned in the scene, etc.

In some cases, contextual information involving execution of a particular function or application may be used in a conversation. This contextual information may be used even if the conversation involves the execution of a different function or application. Information may be stored as one or more named entities (e.g., "George Wilson" is a character entity, "West Egg" and "Long Island Sound" are location entities, etc.). In some embodiments, the information may be stored in other ways, such as transcripts of user utterances, databases, collections of "tagged" information, such as in a knowledge base, a "map" of prior conversations, etc.

For example, in a conversation, the user may ask the client device, "Who is he?" The spoken language processing system may receive contextual information and location information indicating that the user was watching a movie at the time of the user's query. The spoken language processing system may determine that the user is inquiring about a person or character entity. Contextual processing may indicate to the spoken language processing system that the user is likely inquiring about George Wilson, as George Wilson may be the only male character entity tagged for that particular audio book page or timepoint. The system may then provide the user with responsive information about the character George Wilson. The system may have received this information from a database or knowledge base. This information may be provided to the user without requiring additional contextual information from the user. Accordingly, the user-perceived performance of the system may be improved, because the user is provided with the desired information quickly and without being prompted for a great deal of additional information.

Certain speech processing systems may be configured such that a user may have access to many different local devices that can capture the user's speech and/or output audio or video data in response to a command. Multiple different local devices may be linked to a single user account, such as a household account, that may include information used to process incoming utterances. For example, a user's home may be configured with many local devices that all communicate to the same back-end platform that performs the ASR, NLU, command execution, etc. In such systems, it may be possible for a conversation to take place between the user and the system using more than one local device. For example, the user may start a conversation while in one room, walk to another room, and desire to continue the conversation. In another example, one user may engage in one conversation with one local device in a home, while another user in the same home may engage in a different conversation with a different local device in the same home. For example, one user may be standing in the kitchen talking to a first device in the kitchen and ask "How old is the President?" After an answer is spoken aloud by the first device (e.g., "Barack Obama is fifty-five years old"), the same user walks into the living room and asks a second device in the living room "when was he sworn in?" In still another example, one user may engage in one conversation with one local device in a home and another user may wish to enter the same conversation while in a different room and proximate to a different local device. For example, one user may be standing in the kitchen talking to a first device in the kitchen and ask "How old is the President?" After an answer is spoken aloud by the first device (e.g., "Barack Obama is fifty-five years old"), a second user in the living room may overhear the answer and ask a second device in the living room "when was he sworn in?" In the above examples, in order to properly respond to the second question, the system needs to be configured to understand that the anaphora of the second question refers to the first question and therefore the two questions are part of the same conversation even if originating at different devices.

Offered is a system configured to resolve anaphora, exophora, or other such ambiguous words based on the originating device of an utterance, the individual speaking the utterance, and other data. The system may be configured with rules, trained models, and other decision-making components to determine when certain words refer to entities from previous exchanges with the system. The system may thus process device identifiers (IDs), speaker IDs, account IDs, and other data to determine what entity corresponds to a word of an utterance.

FIGS. 1A-1D show a speech processing system 100 capable of resolving ambiguous entity references based on a speaker ID according to aspects of the present disclosure. Although the figures and discussion illustrate certain operational steps of the system 100 in a particular order, the steps described may be performed in a different order (as well as certain steps removed or added) without departing from the intent of the disclosure. As shown in FIGS. 1A-1C, the system 100 may include one or more speech-controlled devices 110a and 110b local to users 5a-5b, as well as one or more networks 199 and one or more servers 120 connected to speech-controlled device(s) 110 across network(s) 199. The server(s) 120 (which may be one or more different physical devices) may be capable of performing traditional speech processing (e.g., ASR, NLU, command processing, etc.) as described herein. A single server 120 may perform all speech processing or multiple servers 120 may combine to perform all speech processing. Further, the server(s) 120 may execute certain commands, such as answering spoken utterances of the users 5. In addition, certain speech detection or command execution functions may be performed by the speech-controlled device 110.

In one example, as shown in FIG. 1A, the system may process two utterances captured by two different devices from the same user and related to the same conversation. As shown in FIG. 1A, a first speech-controlled device 110a may capture audio of a first spoken utterance (i.e., first input audio 11a) from first user 5a via a microphone of the first speech-controlled device 110a. The first speech-controlled device 110a may send first input audio data corresponding to the first input audio 11a to the server 120 for processing. Alternatively, a separate microphone array (not illustrated) may capture the input audio 11. In an example, the microphone array is in direct communication with the speech-controlled device 110 such that when the microphone array captures the input audio 11, the microphone array sends input audio data corresponding to the input audio 11 to the speech-controlled device 110. In another example, the microphone array is in indirect communication with the speech-controlled device 110 via a companion application of a mobile computing device (not illustrated), such as a smart phone, tablet, laptop, etc. In this example, when the microphone array captures the input audio 11, the microphone array sends input audio data corresponding to the input audio 11 to the companion application, which forwards the input audio data to the speech-controlled device 110. Upon receiving the input audio data from the microphone array, the speech-controlled device 110 may forward the input audio data to the server 120 for processing. In yet another example, the microphone array is in indirect communication with the server 120 via the companion application such that when the microphone array captures the input audio 11, the microphone array sends input audio data corresponding to the input audio 11 to the companion application, which forwards the input audio data to the server 120 for processing.

The server 120 may receive (130), from the first device 110a, first audio data corresponding to the first utterance. The server 120 may determine that the first audio data is associated with a first device ID (e.g., an ID associated with device 110a). The server 120 may also determine (132) that the first audio data is associated with a first speaker ID. For example, the server 120 may determine that the user 1 spoke the first utterance. This determination may be done by performing speaker identification on the first audio data to determine that the first audio data corresponds to user 1. For example, the system may process the first audio data to determine a correspondence between the first audio data and stored data (such as feature vectors corresponding to the user, a voice signature of the user, or the like) corresponding to user 1. Alternatively, or in addition, the determination may be performed using other techniques, such as detecting that a wearable device of user 1 was nearby device 110a when the audio was received, or through other techniques. Other techniques of identifying the user may include use of visual information (for example facial recognition using a camera communicable with the system 100), identifying the user based on a unique passphrase or wakeword uttered by the user, identifying the user based on an email address or other account information linked to the input to the system (which may not necessarily be voiced based) or the like. The server 120 may process (134) the first audio data (for example using ASR, NLU, or other techniques) to determine a first entity corresponding to the first utterance. The first entity may be explicitly mentioned in the first utterance, may be provided by the system in response to the first utterance, or the like. The first entity may be associated with a first entity ID, which may identify the first entity relative to other entities known to the system. The system may then execute some command associated with the first input audio data. The command may be to obtain information related to the first entity, to play media content, or some other command.

At a later point in time, a second speech-controlled device 110b may capture audio of a second spoken utterance (i.e., second input audio 11b) from first user 5a. The server 120 may receive (136), from the second device, second audio data corresponding to the second utterance. The server 120 may determine that the second audio data is associated with a second device ID (e.g., an ID associated with device 110b). The server 120 may also determine (138) that the second audio data is associated with the first speaker ID. This determination may also be done by performing speaker identification or may be performed using other techniques. The server 120 may process (140) the second audio data to determine second text (for example user ASR processing). The server 120 may then determine (142) that the second text includes a word corresponding to an entity, but the entity is not itself represented in the second audio data and therefore the word may constitute anaphora, exophora, or the like. This determination may be made using an NLU component such as a named entity recognition component 262 (discussed below) or other component. The server 120 may then determine (144), using the first speaker ID, the first and/or second device IDs and/or other information (such as the relative locations of devices 110a and 110b, the time between receipt of the first input audio data and second input audio data, or other information), that the word corresponds to the first entity from the first utterance. This may include determining that the first utterance and second utterance are part of the same conversation and thus the anaphora in the second utterance relates to the first utterance. The server 120 may then execute (146) a command corresponding to the second text using the first entity.

In another example, as shown in FIG. 1B, the system may process two utterances captured by the same device but from two different users and related to the same conversation. As shown in FIG. 1B, a first speech-controlled device 110a may capture audio of a first spoken utterance (i.e., first input audio 11a) from first user 5a via a microphone of the first speech-controlled device 110a. The first speech-controlled device 110a may send first input audio data corresponding to the first input audio 11a to the server 120 for processing. Alternatively, a separate microphone array (not illustrated) may capture the input audio 11. The server 120 may receive (130), from the first device 110a, first audio data corresponding to the first utterance. The server 120 may determine that the first audio data is associated with a first device ID (e.g., an ID associated with device 110a). The server 120 may also determine (132) that the first audio data is associated with a first speaker ID. For example, the server 120 may determine that the user 1 spoke the first utterance. This determination may also be done by performing speaker identification or may be performed using other techniques. The server 120 may process (134) the first audio data (for example using ASR, NLU, or other techniques) to determine a first entity corresponding to the first utterance. The first entity may be explicitly mentioned in the first utterance, may be provided by the system in response to the first utterance, or the like. The first entity may be associated with a first entity ID, which may identify the first entity relative to other entities known to the system. The system may then execute some command associated with the first input audio data. The command may be to obtain information related to the first entity, to play media content, or some other command.

At a later point in time, the first speech-controlled device 110*a* may capture audio of a second spoken utterance (i.e., second input audio 11*b*) from first user 5*a*. The server 120 may receive (150), from the first device, second audio data corresponding to the second utterance. The server 120 may determine that the second audio data is associated with the first device ID (e.g., an ID associated with device 110*a*). The server 120 may also determine (152) that the second audio data is associated with a second speaker ID. This determination may also be done by performing speaker identification or may be performed using other techniques. The server 120 may process (140) the second audio data to determine second text (for example user ASR processing). The server 120 may then determine (142) that the second text includes a word corresponding to an entity, but the entity is not itself represented in the second audio data and therefore the word may constitute anaphora, exophora, or the like. This determination may be made using an NLU component such as a named entity recognition component 262 (discussed below) or other component. The server 120 may then determine (154), using the first device ID, the first and/or second speaker IDs and/or other information (such as the time between receipt of the first input audio data and second input audio data, or other information), that the word corresponds to the first entity from the first utterance. This may include determining that the first utterance and second utterance are part of the same conversation and thus the anaphora in the second utterance relates to the first utterance. The server 120 may then execute (146) a command corresponding to the second text using the first entity.

In another example, as shown in FIG. 1C, the system may process two utterances captured by two different devices from two different users, but related to the same conversation. As shown in FIG. 1C, a first speech-controlled device 110*a* may capture audio of a first spoken utterance (i.e., first input audio 11*a*) from first user 5*a* via a microphone of the first speech-controlled device 110*a*. The first speech-controlled device 110*a* may send first input audio data corresponding to the first input audio 11*a* to the server 120 for processing. Alternatively, a separate microphone array (not illustrated) may capture the input audio 11. The server 120 may receive (130), from the first device 110*a*, first audio data corresponding to the first utterance. The server 120 may determine that the first audio data is associated with a first device ID (e.g., an ID associated with device 110*a*). The server 120 may also determine (132) that the first audio data is associated with a first speaker ID. For example, the server 120 may determine that the user 1 spoke the first utterance. This determination may also be done by performing speaker identification or may be performed using other techniques. The server 120 may process (134) the first audio data (for example using ASR, NLU, or other techniques) to determine a first entity corresponding to the first utterance. The first entity may be explicitly mentioned in the first utterance, may be provided by the system in response to the first utterance, or the like. The first entity may be associated with a first entity ID, which may identify the first entity relative to other entities known to the system. The system may then execute some command associated with the first input audio data. The command may be to obtain information related to the first entity, to play media content, or some other command.

At a later point in time, the second speech-controlled device 110*b* may capture audio of a second spoken utterance (i.e., second input audio 11*b*) from second user 5*b*. The server 120 may receive (160), from the second device, second audio data corresponding to the second utterance. The server 120 may determine that the second audio data is associated with the second device ID (e.g., an ID associated with device 110*b*). The server 120 may also determine (152) that the second audio data is associated with a second speaker ID. This determination may also be done by performing speaker identification or may be performed using other techniques. The server 120 may process (140) the second audio data to determine second text (for example user ASR processing). The server 120 may then determine (142) that the second text includes a word corresponding to an entity, but the entity is not itself represented in the second audio data and therefore the word may constitute anaphora, exophora, or the like. This determination may be made using an NLU component such as a named entity recognition component 262 (discussed below) or other component. The server 120 may then determine (162), using the first and/or second device IDs, the first and/or second speaker IDs and/or other information (such as the relative locations of devices 110*a* and 110*b*, the time between receipt of the first input audio data and second input audio data, a semantic analysis of the first and/or second utterance, or other information), that the word corresponds to the first entity from the first utterance. This may include determining that the first utterance and second utterance are part of the same conversation and thus the anaphora in the second utterance relates to the first utterance. The server 120 may then execute (146) a command corresponding to the second text using the first entity.

In still another example, as shown in FIG. 1D the system may process two utterances captured by two different devices from two different users and related to two different conversations. As shown in FIG. 1D, a first speech-controlled device 110*a* may capture audio of a first spoken utterance (i.e., first input audio 11*a*) from first user 5*a* via a microphone of the first speech-controlled device 110*a*. The first speech-controlled device 110*a* may send first input audio data corresponding to the first input audio 11*a* to the server 120 for processing. Alternatively, a separate microphone array (not illustrated) may capture the input audio 11. The server 120 may receive (130), from the first device 110*a*, first audio data corresponding to the first utterance. The server 120 may determine that the first audio data is associated with a first device ID (e.g., an ID associated with device 110*a*). The server 120 may also determine (132) that the first audio data is associated with a first speaker ID. For example, the server 120 may determine that the user 1 spoke the first utterance. This determination may also be done by performing speaker identification or may be performed using other techniques. The server 120 may process (134) the first audio data (for example using ASR, NLU, or other techniques) to determine a first entity corresponding to the first utterance. The first entity may be explicitly mentioned in the first utterance, may be provided by the system in response to the first utterance, or the like. The first entity may be associated with a first entity ID, which may identify the first entity relative to other entities known to the system. The system may then execute some command associated with the first input audio data. The command may be to obtain information related to the first entity, to play media content, or some other command.

At a later point in time, the second speech-controlled device 110*b* may capture audio of a second spoken utterance (i.e., second input audio 11*b*) from second user 5*b*. The server 120 may receive (160), from the second device, second audio data corresponding to the second utterance. The server 120 may determine that the second audio data is associated with the second device ID (e.g., an ID associated with device 110*b*). The server 120 may also determine (152) that the second audio data is associated with a second speaker ID. This determination may also be done by performing speaker identification or may be performed using other techniques. The server 120 may process (140) the second audio data to determine second text (for example user ASR processing). The server 120 may then determine (142) that the second text includes a word corresponding to an entity, but the entity is not itself represented in the second audio data and therefore the word may constitute anaphora, exophora, or the like. This determination may be made using an NLU component such as a named entity recognition component 262 (discussed below) or other component. The server 120 may then determine (164), using the first and/or second device IDs, the first and/or second speaker IDs and/or other information (such as the relative locations of devices 110*a* and 110*b*, the time between receipt of the first input audio data and second input audio data, a semantic analysis of the first and/or second utterance, or other information), that the word does not correspond to the first entity from the first utterance, but rather corresponds to some other second entity that may be part of a different conversation or different exchange between a user and the system. This may include determining that the first utterance and second utterance are part of a different conversation and thus the anaphora in the second utterance does not relate to the first utterance. The server 120 may then execute (166) a command corresponding to the second text using the second entity. Various techniques of device may be used to determine whether utterances belong to a same or different conversation. Those techniques may use speaker IDs, device IDs, and/or other information.

Further details of the speech-processing system 100 including anaphora resolution are explained below, following a discussion of the overall speech processing system of FIG. 2. It is important to note however, that the anaphora-related resolution techniques discussed herein may apply not only to spoken queries and commands but also to commands/queries received from a text based input, such as a keyboard, touchscreen, etc. Thus, while the present application describes anaphora resolution with respect to a speech-processing system, the present techniques may be applicable to other systems as well.

The system 100 of FIGS. 1A-1D may operate using various speech processing components as described in FIG. 2. FIG. 2 is a conceptual diagram of how a spoken utterance is processed. The various components illustrated may be located on a same or different physical devices. Communication between various components illustrated in FIG. 2 may occur directly or across a network 199. An audio capture component, such as the microphone of the speech-controlled device 110 (or other device), captures input audio 11 corresponding to a spoken utterance. The device 110, using a wakeword detection module 220, then processes the audio, or audio data corresponding to the audio, to determine if a keyword (such as a wakeword) is detected in the audio. Following detection of a wakeword, the device sends audio data 111 corresponding to the utterance, to a server 120 that includes an ASR module 250. The audio data 111 may be output from an acoustic front end (AFE) 256 located on the device 110 prior to transmission. Or the audio data 111 may be in a different form for processing by a remote AFE 256, such as the AFE 256 located with the ASR module 250.

The wakeword detection module 220 works in conjunction with other components of the device 110, for example a microphone (not illustrated) to detect keywords in audio 11. For example, the device 110 may convert audio 11 into audio data, and process the audio data with the wakeword detection module 220 to determine whether speech is detected, and if so, if the audio data comprising speech matches an audio signature and/or model corresponding to a particular keyword.

The device 110 may use various techniques to determine whether audio data includes speech. Some embodiments may apply voice activity detection (VAD) techniques. Such techniques may determine whether speech is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the device 110 may implement a limited classifier configured to distinguish speech from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in speech storage, which acoustic models may include models corresponding to speech, noise (such as environmental noise or background noise), or silence. Still other techniques may be used to determine whether speech is present in the audio input.

Once speech is detected in the audio received by the device 110 (or separately from speech detection), the device 110 may use the wakeword detection module 220 to perform wakeword detection to determine when a user intends to speak a command to the device 110. This process may also be referred to as keyword detection, with the wakeword being a specific example of a keyword. Specifically, keyword detection is typically performed without performing linguistic analysis, textual analysis or semantic analysis. Instead, incoming audio (or audio data) is analyzed to determine if specific characteristics of the audio match preconfigured acoustic waveforms, audio signatures, or other data to determine if the incoming audio "matches" stored data corresponding to a keyword.

Thus, the wakeword detection module 220 may compare audio data to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds HMMs for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating a hybrid DNN-HMM decoding framework. In another embodiment the wakeword spotting system may be built on deep neural network (DNN)/recursive neural network (RNN) structures directly, without MINI involved. Such a system may estimate the posteriors of wakewords with context information, either by stacking frames within a context window for DNN, or using RNN. Following-on posterior threshold tuning or smoothing is applied for decision making. Other techniques for wakeword detection, such as those known in the art, may also be used.

Once the wakeword is detected, the local device 110 may "wake" and begin transmitting audio data 111 corresponding to input audio 11 to the server(s) 120 for speech processing. Audio data corresponding to that audio may be sent to a server 120 for routing to a recipient device or may be sent to the server for speech processing for interpretation of the included speech (either for purposes of enabling voice-communications and/or for purposes of executing a command in the speech). The audio data 111 may include data corresponding to the wakeword, or the portion of the audio data corresponding to the wakeword may be removed by the local device 110 prior to sending.

Upon receipt by the server(s) 120, an ASR module 250 may convert the audio data 111 into text. The ASR module 250 transcribes the audio data 111 into text data representing words of speech contained in the audio data 111. The text data may then be used by other components for various purposes, such as executing system commands, inputting data, etc. A spoken utterance in the audio data 111 is input to a processor configured to perform ASR, which then interprets the spoken utterance based on a similarity between the spoken utterance and pre-established language models 254 stored in an ASR model knowledge base (i.e., ASR model storage 252). For example, the ASR module 250 may compare the audio data 111 with models for sounds (e.g., subword units or phonemes) and sequences of sounds to identify words that match the sequence of sounds spoken in the spoken utterance of the audio data 111.

The different ways a spoken utterance may be interpreted (i.e., the different hypotheses) may each be assigned a probability or a confidence score representing a likelihood that a particular set of words matches those spoken in the spoken utterance. The confidence score may be based on a number of factors including, for example, a similarity of the sound in the spoken utterance to models for language sounds (e.g., an acoustic model 253 stored in the ASR model storage 252), and a likelihood that a particular word that matches the sound would be included in the sentence at the specific location (e.g., using a language model 254 stored in the ASR model storage 252). Thus, each potential textual interpretation of the spoken utterance (i.e., hypothesis) is associated with a confidence score. Based on the considered factors and the assigned confidence score, the ASR module 250 outputs the most likely text recognized in the audio data 111. The ASR module 250 may also output multiple hypotheses in the form of a lattice or an N-best list with each hypothesis corresponding to a confidence score or other score (e.g., such as probability scores, etc.).

The device or devices including the ASR module 250 may include an AFE 256 and a speech recognition engine 258. The AFE 256 transforms the audio data 111, captured by the microphone 807, into data for processing by the speech recognition engine 258. The speech recognition engine 258 compares the speech recognition data with acoustic models 253, language models 254, and other data models and information for recognizing the speech conveyed in the audio data 111. The AFE 256 may reduce noise in the audio data 111 and divide the digitized audio data 111 into frames representing time intervals for which the AFE 256 determines a number of values (i.e., features) representing qualities of the audio data 111, along with a set of those values (i.e., a feature vector or audio feature vector) representing features/qualities of the audio data 111 within each frame. Many different features may be determined, as known in the art, and each feature represents some quality of the audio that may be useful for ASR processing. A number of approaches may be used by the AFE 256 to process the audio data 111, such as mel-frequency cepstral coefficients (MFCCs), perceptual linear predictive (PLP) techniques, neural network feature vector techniques, linear discriminant analysis, semi-tied covariance matrices, or other approaches known to those skilled in the art.

The speech recognition engine 258 may process data output from the AFE 256 with reference to information stored in the ASR model storage 252. Alternatively, post front-end processed data (e.g., feature vectors) may be received by the device executing ASR processing from another source besides the internal AFE 256. For example, the speech-controlled device 110 may process audio data 111 into feature vectors (e.g., using an on-device AFE 256) and transmit that information to the server 120 across the network 199 for ASR processing. Feature vectors may arrive at the server 120 encoded, in which case they may be decoded prior to processing by the processor executing the speech recognition engine 258.

The speech recognition engine 258 attempts to match received feature vectors to language phonemes and words as known in the stored acoustic models 253 and language models 254. The speech recognition engine 258 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving a likelihood that the ASR module 250 will output speech results that make sense grammatically.

The speech recognition engine 258 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 258 to other processing components, which may be local to the device performing ASR and/or distributed across the network(s) 199. For example, ASR results in the form of a single textual representation of the speech, an N-best list including multiple hypotheses and respective scores, lattice, etc. may be sent to a server, such as the server 120, for natural language understanding (NLU) processing, such as conversion of the text data into commands for execution, either by the speech-controlled device 110, by the server 120, or by another device (e.g., a server running a search engine, etc.)

The device performing NLU processing 260 (e.g., server 120) may include various components, including potentially dedicated processor(s), memory, storage, etc. As shown in FIG. 2, an NLU component may include a recognizer 263 that includes a named entity recognition (NER) module 262 which is used to identify portions of query text that correspond to a named entity that may be recognizable by the system. A downstream process called named entity resolution actually links a text portion to an actual specific entity known to the system. To perform named entity resolution, the system may utilize gazetteer information (284*a*-284*n*) stored in entity library storage 282. The gazetteer information may be used for entity resolution, for example matching ASR results with different entities (such as song titles, contact names, etc.) Gazetteers may be linked to users (for example a particular gazetteer may be associated with a specific user's music collection), may be linked to certain domains (such as shopping), or may be organized in a variety of other ways. The NER module 262 (or other component) may also determine whether a word refers to an entity that is not explicitly mentioned in the utterance text, for example "him," "her," "it" or other anaphora, exophora or the like. A further downstream component, such as an anaphora resolver 710 (discussed below) may identify the entity referred to by the word(s), thus resolving the anaphora.

Generally, the NLU process takes textual input (such as processed from ASR 250 based on the utterance input audio 11) and attempts to make a semantic interpretation of the text. That is, the NLU process determines the meaning behind the text based on the individual words and then implements that meaning. NLU processing 260 interprets a text string to derive an intent or a desired action from the user as well as the pertinent pieces of information in the text that allow a device (e.g., device 110) to complete that action. For example, if a spoken utterance is processed using ASR 250 and outputs the text "call mom" the NLU process may determine that the user intended to activate a telephone in his/her device and to initiate a call with a contact matching the entity "mom" (which may involve a downstream command processor 290 linked with a telephone application).

The NLU may process several textual inputs related to the same utterance. For example, if the ASR 250 outputs N text segments (as part of an N-best list), the NLU may process all N outputs to obtain NLU results.

As will be discussed further below, the NLU process may be configured to parsed and tagged to annotate text as part of NLU processing. For example, for the text "call mom," "call" may be tagged as a command (to execute a phone call) and "mom" may be tagged as a specific entity and target of the command (and the telephone number for the entity corresponding to "mom" stored in a contact list may be included in the annotated result). Further, the NLU process may be used to provide answer data in response to queries, for example using the knowledge base 272.

To correctly perform NLU processing of speech input, an NLU process 260 may be configured to determine a "domain" of the utterance so as to determine and narrow down which services offered by the endpoint device (e.g., server 120 or device 110) may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The named entity recognition (NER) module 262 receives a query in the form of ASR results and attempts to identify relevant grammars and lexical information that may be used to construe meaning. To do so, the NLU module 260 may begin by identifying potential domains that may relate to the received query. The NLU storage 273 includes a databases of devices (274*a*-274*n*) identifying domains associated with specific devices. For example, the device 110 may be associated with domains for music, telephony, calendaring, contact lists, and device-specific communications, but not video. In addition, the entity library may include database entries about specific services on a specific device, either indexed by Device ID, Speaker ID, or Household ID, or some other indicator.

In NLU processing, a domain may represent a discrete set of activities having a common theme, such as "shopping", "music", "calendaring", etc. As such, each domain may be associated with a particular recognizer 263, language model and/or grammar database (276*a*-276*n*), a particular set of intents/actions (278*a*-278*n*), and a particular personalized lexicon (286). Each gazetteer (284*a*-284*n*) may include domain-indexed lexical information associated with a particular user and/or device. For example, the Gazetteer A (284*a*) includes domain-index lexical information 286*aa* to 286*an*. A user's music-domain lexical information might include album titles, artist names, and song names, for example, whereas a user's contact-list lexical information might include the names of contacts. Since every user's music collection and contact list is presumably different, this personalized information improves entity resolution.

As noted above, in traditional NLU processing, a query may be processed applying the rules, models, and information applicable to each identified domain. For example, if a query potentially implicates both communications and music, the query may, substantially in parallel, be NLU processed using the grammar models and lexical information for communications, and will be processed using the grammar models and lexical information for music. The responses based on the query produced by each set of models is scored (discussed further below), with the overall highest ranked result from all applied domains is ordinarily selected to be the correct result. This is described further in detail below in reference to FIG. 3.

An intent classification (IC) module 264 parses the query to determine an intent or intents for each identified domain, where the intent corresponds to the action to be performed that is responsive to the query. Each domain is associated with a database (278*a*-278*n*) of words linked to intents. For example, a music intent database may link words and phrases such as "quiet," "volume off," and "mute" to a "mute" intent. The IC module 264 identifies potential intents for each identified domain by comparing words in the query to the words and phrases in the intents database 278. Traditionally, the determination of an intent by the IC module is performed using a set of rules or templates that are processed against the incoming text to identify a matching intent.

In order to generate a particular interpreted response, the NER 262 applies the grammar models and lexical information associated with the respective domain to actually recognize a mention one or more entities in the text of the query. In this manner the NER 262 identifies "slots" (i.e., particular words in query text) that may be needed for later command processing. Depending on the complexity of the NER 262, it may also label each slot with a type of varying levels of specificity (such as noun, place, city, artist name, song name, or the like). Each grammar model 276 includes the names of entities (i.e., nouns) commonly found in speech about the particular domain (i.e., generic terms), whereas the lexical information 286 from the gazetteer 284 is personalized to the user(s) and/or the device. For instance, a grammar model associated with the shopping domain may include a database of words commonly used when people discuss shopping.

The intents identified by the IC module 264 are linked to domain-specific grammar frameworks (included in 276) with "slots" or "fields" to be filled. Each slot/field corresponds to a portion of the query text that the system believes corresponds to an entity. For example, if "play music" is an identified intent, a grammar (276) framework or frameworks may correspond to sentence structures such as "Play {Artist Name}," "Play {Album Name}," "Play {Song name}," "Play {Song name} by {Artist Name}," etc. However, to make resolution more flexible, these frameworks would ordinarily not be structured as sentences, but rather based on associating slots with grammatical tags.

For example, the NER module 262 may parse the query to identify words as subject, object, verb, preposition, etc., based on grammar rules and/or models, prior to recognizing named entities. The identified verb may be used by the IC module 264 to identify intent, which is then used by the NER module 262 to identify frameworks. A framework for an intent of "play" may specify a list of slots/fields applicable to play the identified "object" and any object modifier (e.g., a prepositional phrase), such as {Artist Name}, {Album Name}, {Song name}, etc. The NER module 262 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

For instance, a query of "play mother's little helper by the rolling stones" might be parsed and tagged as {Verb}: "Play," {Object}: "mother's little helper," {Object Preposition}: "by," and {Object Modifier}: "the rolling stones." At this point in the process, "Play" is identified as a verb based on a word database associated with the music domain, which the IC module 264 will determine corresponds to the "play music" intent. At this stage, no determination has been made as to the meaning of "mother's little helper" and "the rolling stones," but based on grammar rules and models, it is determined that the text of these phrases relate to the grammatical object (i.e., entity) of the query.

The frameworks linked to the intent are then used to determine what database fields should be searched to determine the meaning of these phrases, such as searching a user's gazette for similarity with the framework slots. So a framework for "play music intent" might indicate to attempt to resolve the identified object based {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer does not resolve the slot/field using gazetteer information, the NER module 262 may search the database of generic words associated with the domain (in the knowledge base 272). So for instance, if the query was "play songs by the rolling stones," after failing to determine an album name or song name called "songs" by "the rolling stones," the NER component 262 may search the domain vocabulary for the word "songs." In the alternative, generic words may be checked before the gazetteer information, or both may be tried, potentially producing two different results.

The results of NLU processing may be tagged to attribute meaning to the query. So, for instance, "play mother's little helper by the rolling stones" might produce a result of: {domain} Music, {intent} Play Music, {artist name} "rolling stones," {media type} SONG, and {song title} "mother's little helper." As another example, "play songs by the rolling stones" might produce: {domain} Music, {intent} Play Music, {artist name} "rolling stones," and {media type} SONG.

The output data from the NLU processing (which may include tagged text, commands, etc.) may then be sent to a command processor 290, which may be located on a same or separate server 120 as part of system 100. The system 100 may include more than one command processor 290, and the destination command processor 290 may be determined based on the NLU output. For example, if the NLU output includes a command to play music, the destination command processor 290 may be a music playing application, such as one located on device 110 or in a music playing appliance, configured to execute a music playing command. If the NLU output includes a search utterance (e.g., requesting the return of search results), the command processor 290 selected may include a search engine processor, such as one located on a search server, configured to execute a search command and determine search results, which may include output text data to be processed by a TTS engine and output from a device as synthesized speech.

The NLU operations of existing systems may take the form of a multi-domain architecture, such as that illustrated in FIG. 3. In the illustrated architecture, each domain (which may include a set of intents and entity slots that define a larger concept such as music, books etc. as well as components such as trained models, etc. used to perform various NLU operations such as NER, IC, or the like) may be constructed separately and made available to an NLU component 260 during runtime operations where NLU operations are performed on text (such as text output from an ASR component 250). Each domain may have specially configured components to perform various steps of the NLU operations.

For example, in a typical NLU system, the system may include a multi-domain architecture consisting of multiple domains for intents/commands executable by the system (or by other devices connected to the system), such as music, video, books, and information. The system may include a plurality of domain recognizers 335, where each domain may include its own recognizer 263. Each recognizer may include various NLU components such as an NER component 262, IC module 264 and other components such as an entity resolver, or other components.

For example, a music domain recognizer 263-A (Domain A) may have an NER component 262-A that identifies what slots (i.e., portions of input text) may correspond to particular words relevant to that domain. The words may correspond to entities such as (for the music domain) a performer, album name, song name, etc. An NER component 262 may use a machine learning model, such as a domain specific conditional random field (CRF) to both identify the portions corresponding to an entity as well as identify what type of entity corresponds to the text portion. For example, for the text "play songs by the stones," an NER 262-A trained for a music domain may recognize the portion of text [the stones] corresponds to an entity and an artist name. The music domain recognizer 263-A may also have its own intent classification (IC) component 264-A that determines the intent of the text assuming that the text is within the proscribed domain. An IC component may use a model, such as a domain specific maximum entropy classifier to identify the intent of the text, where the intent is the action the user desires the system to perform.

As illustrated in FIG. 3, multiple domains may operate substantially in parallel, with different domain specific components. That is, domain B for video may have its own recognizer 263-B including NER component 262-B, and IC module 264-B. Domain C for books may also have similar components in its recognizer 3-6, and so on for the different domains available to the system. When input text data 300 (e.g., ASR output text) is received, the same text that is input into the NLU pipeline for domain A 263-A may also be input into the NLU pipeline for domain B 263-B, where the components for domain B 263-B will operate on the text as if the text related to domain B, and so on for the different NLU pipelines for the different domains. Each domain specific NLU pipeline will create its own domain specific NLU results, for example NLU results A (for domain A), NLU results B (for domain B), NLU results C (for domain C), and so on. The different NLU results may then be ranked and further processed using other downstream components as explained below.

As shown in FIG. 3, an NER components 262 and IC module 264 may be considered part of a recognizer (such as recognizer 263-A, 263-B, etc.). The recognizers may operate using machine learning trained models such as a CRF, maximum entropy classifier, neural network (such as a deep neural network (DNN) or recurrent neural network (RNN) or other classifier. The recognizers 335 may also use rules that operate on input query text in a particular form to identify named entities and/or intents. The recognizers 335 may also operate using a data structure such as a finite state transducers (FST) to process the query text to perform NER and/or IC. Other techniques or models may also be used to perform NER and/or IC. The techniques may also be used together. For example a set of rules, an FST and a trained machine learning model may all operate on input text substantially in parallel to determine the named entities/ intents of an input utterance. If one technique performs its task with high enough confidence, the system may use the output of that technique over the others. The system may also prioritize the results of different techniques in certain circumstances (for example rules results may be higher priority than FST results may be higher priority than model results, or some other configuration). Each recognizer (such as 263-A, 263-B, 263-C . . . ) may have its own rules, FSTs and/or models operating such that each recognizer operates substantially in parallel to the other recognizers to come up with its own interpretation of the input text.

The output of each recognizer is a N-best list of intents and identified slots representing the particular recognizer's top choices as to the meaning of the input query text, along with scores for each item in the N-best list. For example, for input text 300 of "play poker face by lady gaga," the music domain recognizer 263-A may output an N-best list in the form of:

[0.95] PlayMusicIntent ArtistName: Lady Gaga SongName: Poker Face

[0.02] PlayMusicIntent ArtistName: Lady Gaga

[0.01] PlayMusicIntent ArtistName: Lady Gaga AlbumName: Poker Face

[0.01] PlayMusicIntent SongName: Pokerface where NER component 262-A of recognizer 263-A has determined that for different items in the N-best list the words "poker face" correspond to a slot and the words "lady gaga" correspond to a slot. (Though different items in the N-best list interpret those slots differently, for example labeling "poker face" as a song name in one choice but labeling it as an album name in another.) The IC module 264-A of recognizer 263-A has also determined that the intent of the input query is a PlayMusicIntent (and selected that as the intent for each item on the music N-best list). The recognizer 263-A also determined a score for each item on the list representing the recognizer's confidence that the particular item is correct. As can be seen in the example, the top item has the highest score. Each recognizer of the recognizers 335 may operate on the input query text substantially in parallel, resulting in a number of different N-best lists, one for each domain (e.g., one N-best list for music, one N-best list for video, etc.). The size of any particular N-best list output from a particular recognizer is configurable and may be different across domains.

While the recognizers 335 perform NER, that is they may identify words of the input query text that are important for downstream processing (sometimes called light slot filling), and may even label those words according to type (such as artist name, album name, city, or the like), the recognizers 335 may not perform entity resolution (i.e., determining the actual entity corresponding to the words of the input query text). Entity resolution is typically a higher latency process and involves communications with a knowledge base 272 or other component to precisely identify the specific entities. As this process is resource intensive, it may be preferable to not perform this task for each item of every N-best list across the multiple domains as some items have low scores and are unlikely to be used and any resources spent performing entity resolution would be wasted on low scoring items. Thus, a filtering of potential results may first be performed before engaging in more resource intensive processing. To that end, the cumulative N-best lists 340 may be passed to the cross domain processing component 355 which may then further rank the individual items on the N-best list as well as perform other operations.

The cross domain processing component 355 may include a cross-domain ranker 350. The cross-domain ranker 350 takes the group of N-best lists 340 and selects from among the lists the top choices to create a new N-best list that may include items from different domains, but only includes the highest scoring ones of those domains. The purpose of the cross-domain ranker 350 is to create a new list of top scoring potential results, so that downstream (more resource intensive) processes may only operate on the top choices.

As an example of a multi-domain N-best list created by the cross-domain ranker 350, take the example input query text 300 of "play the hunger games." The text may be processed by each of the recognizers 335, and each will output an N-best list, resulting in a group of N-best lists 340 input into the cross domain processing component 355. The cross-domain ranker 350 may then rank the individual items among the N-best lists to create a new N-best list. For example, the cross-domain ranker 350 may output an N-best list in the form of:

[0.78] Video PlayVideoIntent VideoName: The Hunger Games

[0.13] Books ReadBookIntent BookName: The Hunger Games

[0.07] Music PlayMusicIntent AlbumName: Hunger Games where the top items from different N-best lists from multiple domains are grouped into a single N-best list 360. As shown, the top scoring item is from the video domain 263-B, includes the intent "playvideointent" and a slot labeled as video name corresponding to the text "the hunger games." The next item is from the books domain 263-C, includes the intent "readbookintent" and a slot labeled as book name corresponding to the text "the hunger games." Each item in the N-best list 360 may also include a score. The size of the cross domain N-best list 360 is configurable.

While the cross-domain ranker 350 takes as input the N-best lists 340, it may also consider other information, such as other data 391.

The cross domain processing component 355 may also include a light slot filler component 352. This component can take information from slots and alter it to make the data more easily processed by downstream components The operations of the light slot filler component 352 are typically low latency operations that do not involve heavy operations such as reference to a knowledge base. The purpose of the light slot filler component 352 is to replace words with other words or values that may be more easily understood by downstream components. For example, if an input query text included the word "tomorrow" the light slot filler component 352 may replace the word "tomorrow" with an actual date for purposes of downstream processing. Similarly, a word "CD" may be replaced by a word "album." The replaced words are then included in the cross domain N-best list 360.

The N-best list 360 is then output to a heavy slot filler and entity resolution component 370. This component 370 can apply rules or other instructions to standardize labels or tokens from previous stages into an intent/slot representation. The precise transformation may depend on the domain (for example, for a travel domain a text mention of "Boston airport" may be transformed to the standard BOS three-letter code referring to the airport). The resolver 370 can refer to an authority source (such as a knowledge base 272) that is used to specifically identify the precise entity referred to in the entity mention identified in the incoming text. Specific intent/slot combinations may also be tied to a particular source, which may then be used to resolve the text (such as by providing information or a command to be executed in response to a user query). For example, in the example, "play songs by the stones," the resolver 370 may reference to a personal music catalog, Amazon Music account, user profile 604, or the like. The output from the entity resolution component 370 may include an altered N-best list that is based on the cross-domain N-best list 360 but also includes more detailed information about the specific entities mentioned in the text (such as specific entity IDs) and/or more detailed slot data that can eventually be used by a command processor 290 which may be incorporated into the same system components or pipeline or may be on a separate device in communication with the system. While illustrated as a cross-domain resolver, multiple resolution components 370 may exist were a particular resolution component 370 may be specific for one or more domains.

As can be appreciated, the entity resolver 370 may not necessarily be successful in resolving every entity and filling every slot. This may result in incomplete results in the combined N-best list. The final ranker 390 may consider such errors when determining how to rank the ultimate results for potential execution. For example, if an item one of the N-best lists comes from a book domain and includes a read book intent, but the entity resolver 370 cannot find a book with a title matching the input query text, that particular result may be re-scored by the final ranker 390 to be given a lower score. Each item considered by the final ranker 390 may also be assigned a particular confidence, where the confidence may be determined by a recognizer 335, cross domain processor 355 or by the final ranker 390 itself. Those confidence scores may be used to determine how to rank the individual NLU results represented in the N-best lists. The confidence scores may be affected by unfilled slots. For example, if one domain is capable of filling a slot (i.e., resolving the word in the slot to an entity or other recognizable form) for an input query the results from that domain may have a higher confidence than those from a different domain that is not capable of filling a slot.

The final ranker 390 may be configured to apply re-scoring, biasing, or other techniques to obtain the most preferred ultimate result. To do so, the final ranker 390 may consider not only the NLU results of the N-best lists, but may also consider other data 391. This other data 391 may include a variety of information. For example, the other data 391 may also include application rating or popularity. For example, if one application has a particularly high rating, the system may increase the score of results associated with that particular application. The other data 391 may also include information about applications have been specifically enabled by the user (as indicated in a user profile 404, discussed in reference to FIG. 4). NLU results from enabled applications may be scored higher than results from non-enabled applications. User history may also be considered, such as if the user regularly uses a particular supplemental application or does so at particular times of day. Date, time, location, weather, type of device 110, customer ID, context and other information may also be considered. For example, the system may consider when any particular applications are currently active (such as music being played, a game being played, etc.) between the system and device 110. The highest scoring result (or results in the case of multiple commands being in an utterance) may be passed to a downstream command processor 290 for execution.

Following final ranking, the NLU module 260 may output NLU output data 385. The NLU output data 385 may include an indicator of the command to be executed along with data associated with the command, for example an indication that the command is "play music" and the music to be played is "Adele." The NLU output data 385 may be in the form of previous NLU data such as item(s) N-best list 340, item(s) in cross-domain N-best list 360, or the like. The NLU output data 385 may also be in a format executable by the command processor 290, e.g., similar to command data 484. Multiple instances of NLU output data (e.g., 385a-385n) may also be output.

While the text data 300 of FIG. 3 may be output from an ASR component 250, in certain configurations text data 300 may come from another source. For example text input may be captured through a text entry user interface (e.g., a dialog box, menu, etc.) where a user may be engaging in a conversation or submitting a query to the system through a non-voice based user interface. The text entered by the user in this situation may be used as the text data 300. Further, in certain instances the text data 300 may result from performing optical character recognition (OCR) on an image or from processing stylus or other input related to handwriting or handwriting analysis. Further, in certain configurations an NLU module 260 may not process the text data 300 and the text data 300 may be sent directly to a command processor 290, or be input to a different component prior to being sent to command processor 290.

Figure 4:
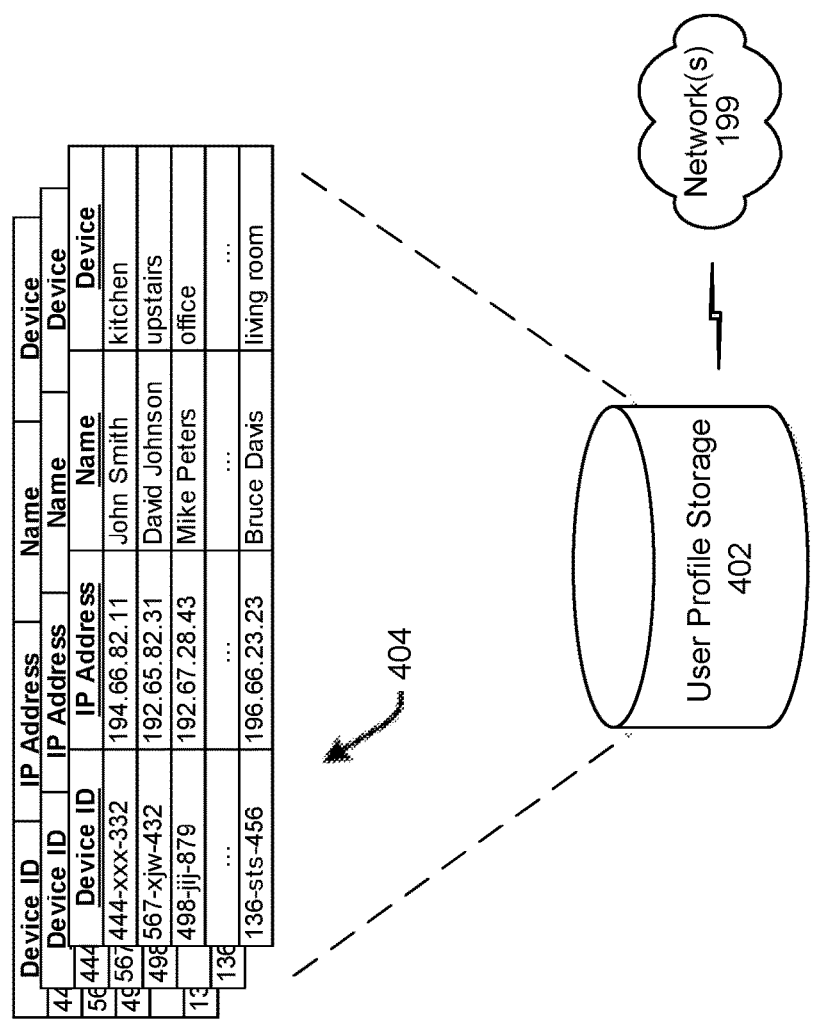
FIG. 4 illustrates data stored and associated with user profiles according to embodiments of the present disclosure.

FIG. 4 illustrates a user profile storage 402 that includes data regarding user accounts 404 as described herein. The user profile storage 402 may be located proximate to the server 120, or may otherwise be in communication with various components, for example over the network 199. The user profile storage 402 may include a variety of information related to individual users, accounts, etc. that interact with the system 100. For illustration, as shown in FIG. 4, the user profile storage 402 may include data regarding the devices associated with particular individual user accounts 404. In an example, the user profile storage 402 is a cloud-based storage. Each user profile 404 may include data such as device identifier (ID) data, speaker identifier (ID) data, voice profiles for users, internet protocol (IP) address data, name of device data, and location of device data for different devices. In addition, while not illustrated, each user profile 404 may include data regarding the locations of individual devices (including how close devices may be to each other in a home, if the device location is associated with a user bedroom, etc.), address data, or other such information. The user profile 404 may also link other devices that enable the system to track when other devices may be displaying/playing other media that may be consumed by a user using one device when an utterance is received by a different device.

As noted above, the present system may be configured to resolve words that refer to entities, where the entity is not explicitly mentioned in the utterance being processed. Such words may be anaphora, exophora, or other examples where the words (such as "he," "she," "that," "this," other pronouns, or the like) refer to some entity that was previously mentioned or some other entity that may be known to the user (such as an actor appearing onscreen) but not mentioned in the utterance. The system may be configured to resolve such ambiguities even when a conversation between a user and a system occurs across devices, or if multiple users engage in a conversation. For example, as shown in FIG. 5A, a user 15a in Room 1 speaks an utterance to device 110a and asks a question such as "How old is the President?" The system may then process the audio of the utterance, determine an answer, and send output audio data back to device 110a to respond "Barack Obama is fifty-five years old." The user may then walk from Room 1 to Room 2 (shown in FIG. 5B) and speak a new utterance to device 110b asking "when was he sworn in?" The system may be configured to recognize that the word "he" in the second utterance corresponds to the entity referred to in the first utterance. That recognition may be performed using rules, machine learning models, etc. that can process the text from the two utterances, the fact that they were both spoken by the same individual, that the unknown word "he" logically may correspond to the entity of the first utterance (Barack Obama), or other information.

Figure 5C:
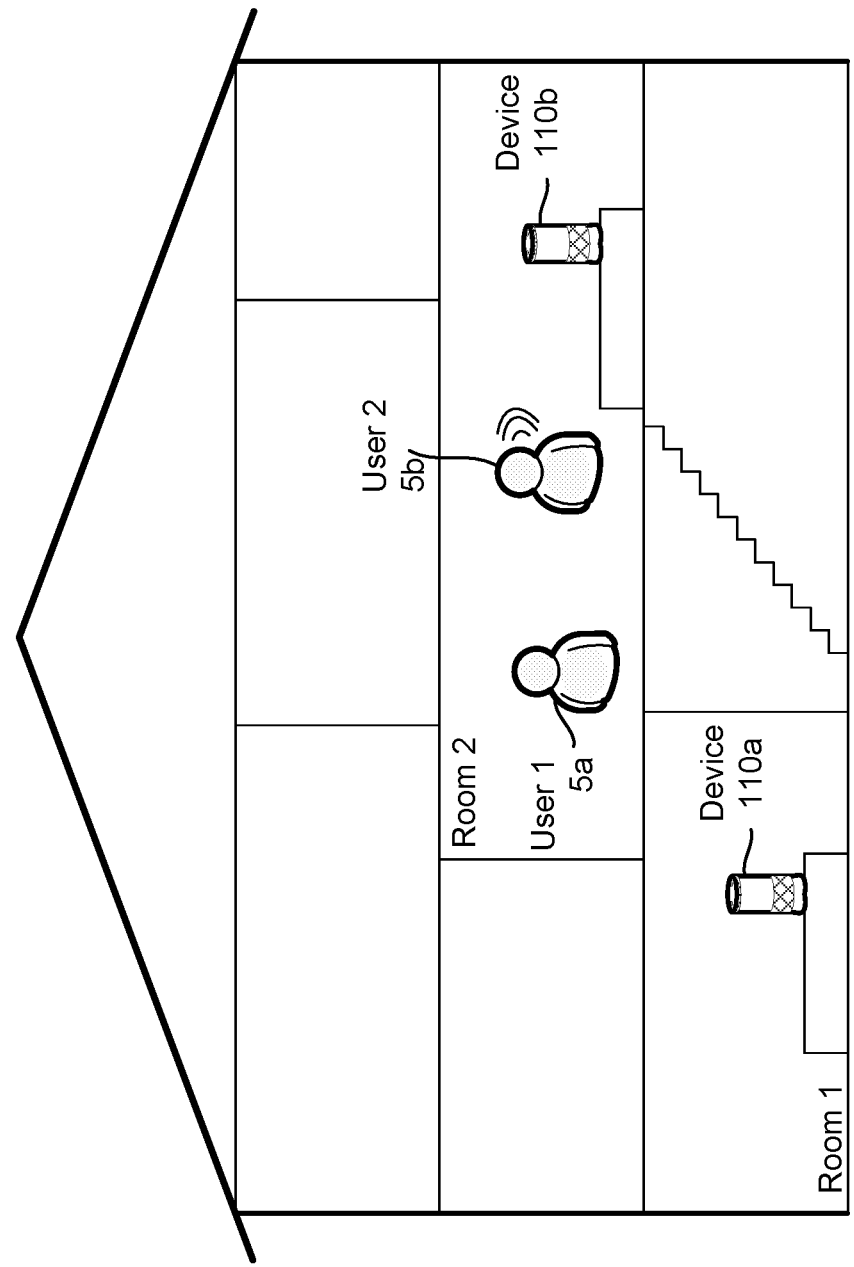

Similarly, in the example shown in FIG. 5C, if the first user 5a asks device 110b "How old is the President," if a second user 5b asks "when was he sworn in" the system may be configured to recognize that the word "he" in the second utterance corresponds to the entity referred to in the first utterance, even though the first utterance was from a different user than the second utterance. That recognition may be performed using rules, machine learning models, etc. that can process the text from the two utterances, the fact that they were both spoken to the same device within a short period of time, that the unknown word "he" logically may correspond to the entity of the first utterance (Barack Obama), or other information.

Further, in the example shown in FIG. 5D, if the first user 5a asks device 110a "How old is the President," if a second user 5b asks device 110b "when was he sworn in" the system may be configured to recognize that the word "he" in the second utterance corresponds to the entity referred to in the first utterance, even though the first utterance was from a different user and different device than the second utterance. That recognition may be performed using rules, machine learning models, etc. that can process the text from the two utterances, the fact that they were both spoken within a short period of time, that they were spoken to devices within a distance from each other that a same conversation may involve users of both devices, that the unknown word "he" logically may correspond to the entity of the first utterance (Barack Obama), or other information. Further, following the question about the President, user 15a may begin a new conversation with the system using device 110a while user 25b continues the first conversation (about the President) with device 110b. The system may be configured to determine when certain conversations start or end so as to properly track entities and which anaphora are related to which entities.

The system may track context information corresponding to utterances being processed by the system. Those utterances may be individual stand-alone utterances, part of ongoing conversations and/or dialogs, or the like. As illustrated in FIG. 6, context data 604 may include a variety of different information. For example, the context data may include data (such as association data) regarding what local device was associated with an utterance, what user spoke the utterance, what entities were involved in the utterance, what time the utterance was spoken or received, whether the entities were spoken by the user or whether the entities were determined by the system in response to the user's utterance. Other data may also be stored by the system in relation to spoken entities, even if not illustrated in FIG. 6. The IDs of FIG. 6, for example the speaker IDs, device IDs, entity IDs, or the like, while illustrated in an easy to understand manner (e.g., "Echo 1," "Joe," "United States") may actually correspond to unique numerical codes (e.g., "56UGV-41XR") that can be used to identify users, devices, or the like. The context data may also include a confidence score associated with the speaker ID, thus representing the system's confidence that the user corresponding to the speaker ID spoke the corresponding utterance. The context data may also track conversations and/or dialogs with a conversation ID that links utterances as part of ongoing conversations. The conversation data may include time of the conversation, length of utterances, the participants of the conversation, subjects of the conversation, etc.

One or more techniques may be used by the system to obtain the speaker ID associated with an utterance. In one technique, audio speaker identification may be performed, where audio data corresponding to the utterance may be compared to stored data corresponding to individual speakers. The system can then match the utterance audio data to the stored data (or some other data indicating how an individual speaker sounds in pitch, volume, speech rate, vocabulary, semantic structure, etc.) to determine who spoke the utterance and thus obtain the ID corresponding to that speaker. In another technique the system may determine a location of a speaker based on a mobile device associated with the speaker such as a phone, tablet, wearable, or the like. The system may then compare the location of that mobile device with the device 110 that captures the audio of the utterance. If the mobile device is proximate to the speech-controlled device 110, the system may determine that the user associated with the mobile device is the speaker and may associate that user's speaker ID with the utterance. Other techniques such as the location of where the utterance is captured (e.g., in a child's room), time of audio capture (e.g., late at night), or a variety of other data may be used to determine the speaker ID to store with the context data. Still further devices (such as cameras) may be used to perform image processing to determine the location of a speaker and if a particular utterance is being spoken by a particular user.

The system may track a certain amount of data (for example, the last two hours worth of utterances, the last X utterances, the last Y entities referred to by users, the last Z entities referred to by the system) and may purge data once the system determines the data to have become stale and not worth preserving. The system may also track context data in different forms, for example keeping one list of context data associated with a specific device, another set (of potentially overlapping) context data associated with a specific user, another set of context data associated with a household account, etc. This context data may be used by the system to resolve anaphoric references.

For example, the top three entries in the illustrative context data of FIG. 6 are associated with utterances captured using device Echo 1. As illustrated, Echo 1 may have detected the following utterances in order:

Joe: "Alexa, where is the nearest Starbucks?"
Mary: "Alexa, who is Barack Obama?"
Joe: "Alexa, play some Weird Al"

If, following those utterances, the system detected a new utterance, from Mary including "Alexa, how old is he?" the system would need to determine what entity the word "he" refers to. Without information regarding who spoke each particular utterance, the system may have been likely to select "Weird Al" as the entity referred to by the word "he," as that was the most recently referred to entity, but with the information that the most recent question was posed by Mary, and that Mary asked about Barack Obama, the system may instead select Barack Obama as the entity in question, and may determine, and return the age of Barack Obama to Mary.

In another example, a first user using a first device linked to a first user account may speak an utterance "Alexa, play Sting." A second user, using a second device associated with the same user account (such as a different device in the same house) may speak an utterance "Alexa, what year did Elvis Presley die?" The first user may then ask the first device "Alexa, play his most recent album." If the system only tracked utterances or entities by linked account, rather than by user and/or originating device, the system may play back for the first user the most recent Elvis album, rather than the most recent Sting album, which is what the user intended. By incorporating information about who spoke each utterance, and which device the utterance originated from, the system may more intelligently determine the entity the word "his" refers to.

In another example, a first user using a first device linked to a first user account may speak an utterance "Alexa, in what year did Canada become a country?" A second user, using the device may follow the first utterance with a second utterance "Alexa, how many provinces did it start with?" In this example, even though the users are different, the utterances are part of the same conversation. Thus, the identity of the user speaking an utterance may be one feature considered by the system in resolving anaphora, but speaker ID may not necessarily be dispositive and anaphora resolution may depend on other factors as well.

Figure 7:
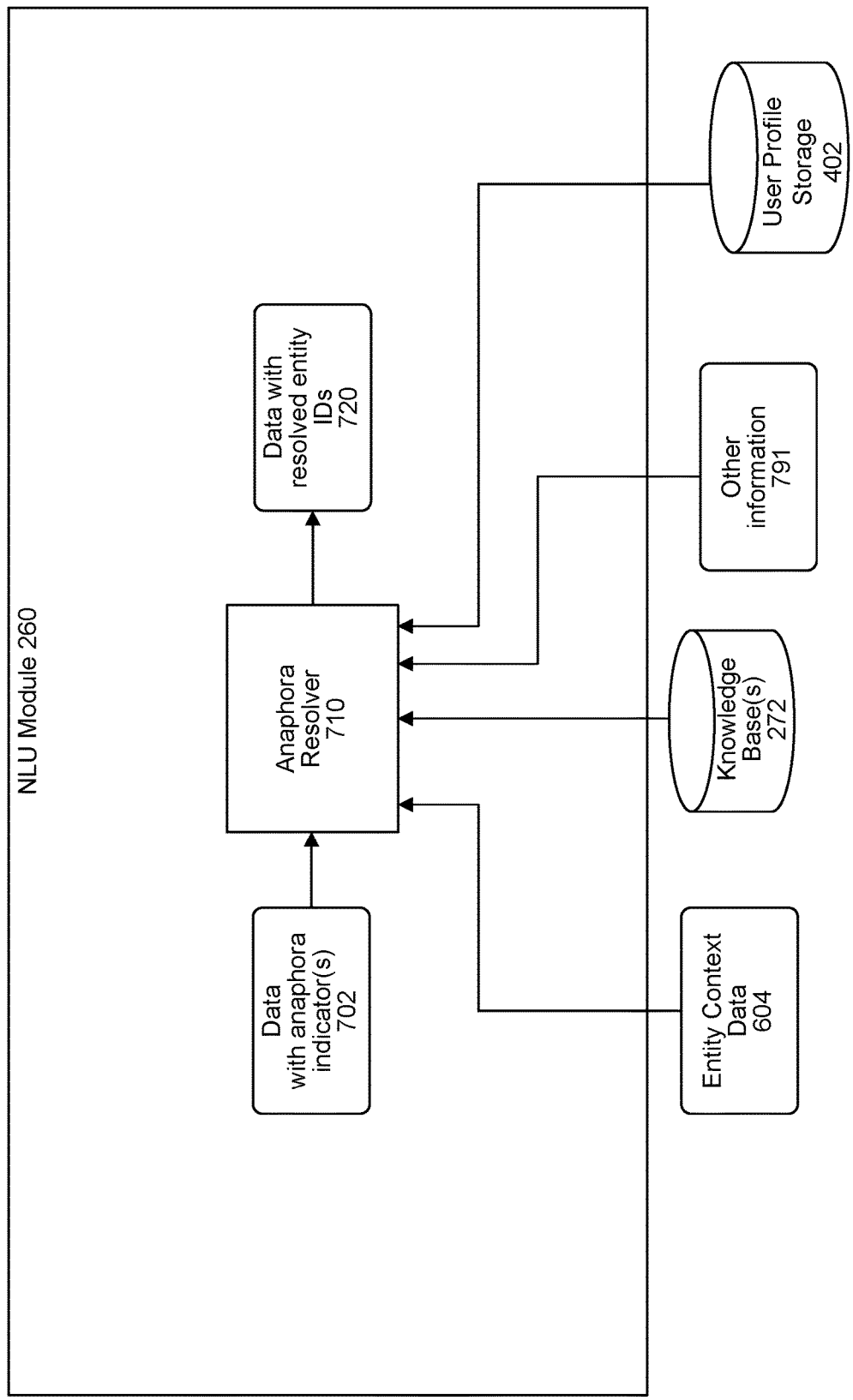
FIG. 7 is a conceptual diagram a system architecture configured to resolve anaphora based on a speaker identification according to embodiments of the present disclosure.

FIG. 7 illustrates an anaphora resolver component 710, which may be incorporated into the NLU module 260 or may be located separately. An NLU component, such as an NER component 262, may identify word(s) that correspond to an entity that is not explicitly mentioned in the utterance. Such word(s) may correspond to anaphora, exophora, or the like. Data 702 including indication(s) of the word(s) may be sent to the anaphora resolver 710. The data 702 may be in the form of an N-best list, for example a post-recognizer N-best list 340, post cross-domain N-best list 360, or other N-best. The data 702 may include the word(s) as well as other data such as other words in the utterance or other ASR/NLU data such as intent data, score data or other information that may be used by the anaphora resolver 710. For example, the data 702 may come in the form of indicators of unknown words, the text of the unknown words and other speech processing data. The data 702 may include different possible ASR/NLU interpretations of the utterance, which the anaphora resolver 710 may process. For example, the data 702 be in the form:

[0.95] GetAge Entity: [unknown] EntityWord: ["she"]
[0.05] GetAge Entity: [Cher]

In this example the ASR/NLU processing had two potential interpretations of an incoming utterance, one (at 95% confidence) in which the user asked "how old is she" and the system processed that utterance to determine that the entity reference/slot "she" was unknown and therefore sent the hypothesis to the anaphora resolver 710 for further processing. The other interpretation (at 5% confidence) is that the user asked "how old is Cher", which may not be indicated to the anaphora resolver 710 for processing, but still may be considered by the anaphora resolver 710 to provide further information of the upstream ASR/NLU processing. The anaphora resolver 710 will receive the indication of an unknown word/slot (e.g., Entity: [unknown] EntityWord: ["she"]) and will then use the data available to it to determine the entity corresponding to the word "she." The anaphora resolver 710 may also receive the indicator of the intent of the command (here, "GetAge") so that once the anaphora resolver 710 determines the appropriate entity, it may pass the entity ID along with the indicator of the intent to a downstream process so that the downstream process may execute the command with the appropriate entity to fulfill the utterance. Alternatively, some other component may track the entity corresponding to the utterance and may match the intent with the entity output by the anaphora resolver 710 for further downstream processing and command execution. The data 702 may also include multiple unknown slots depending on the utterance and/or input text data 300.

Entity context data 604 may also be sent to the anaphora resolver 710. As noted above, the context data 604 may include data regarding both the context of the current utterance as well as the context of previous utterances. The context may include device ID, speaker ID, entity IDs, time data, entity source data, or other information. Such data may be used by the anaphora resolver 710 to link an entity ID with the word(s) indicated in the input data 702.

The context data 604 may also include information about other devices or media being consumed that may be associated with an utterance in process. For example, if a speech processing device 110 is in the room with a television, and a movie is being displayed on the television, the information about that movie may be included in the context data 604 (or in other information 791) so that the anaphora resolver 710 can consider whether anaphora resolution may depend on the media being played back. The context data 604 may also include some semantic information related to previous utterances. The context data 604 and/or the input data 702 may also include semantic information about the current utterance (such as intent, etc.) that may be used to identify an entity corresponding to an ambiguous word in an utterance.

The context data 604, or other information 791 may also include other data which may be used as a feature for purposes of anaphora resolution. For example, a device location (latitude/longitude/address), what devices are nearby the device that captured the utterance, a user's personal data, user profile information (from user profile storage 402), or the like. The anaphora resolver 710 may also access outside information such as a knowledge base 272 that may provide information that can be used to resolve ambiguous words in an utterance. The knowledge base 272 may contain facts, information, definitions, entries, etc. and can provide information that can be used to resolve entity mentions by the anaphora resolver 710. The other information 791 may include information from other data 391.

The anaphora resolver 710 may use a combination of techniques to identify entities corresponding to ambiguous words. For example, the anaphora resolver 710 may use certain rules that govern how anaphora should be resolved. For example, one rule may state that utterances received from different people from different devices, where the utterances are separated by a certain amount of time should be considered as part of separate conversations, and thus the system should not link entities of one utterance to anaphora of the other. Another rule may state that utterances received from different people but from the same device should be considered part of the same conversation. Another rule may state that anaphora originating from a first user should only resolve to an entity involved in an utterance originating from that same user. Many such rules are possible.

The anaphora resolver 710 may use semantic data to link an entity ID to a word. For example, if the word to be resolved is "she," the system may disregard, or apply a lower consideration weight to male entities. Similarly, if the word to be resolved is "they," the system may disregard, or apply a lower consideration weight to singular entities.

The anaphora resolver 710 may also use a machine learning model approach where one or more models are trained on the various inputs discussed herein as features, and the system processes those features using the trained model to determine how to resolve the anaphora.

Various machine learning techniques may be used to perform the training of the anaphora resolver 710 or other components. Models may be trained and operated according to various machine learning techniques. Such techniques may include, for example, inference engines, trained classifiers, etc. Examples of trained classifiers include conditional random fields (CRF) classifiers, Support Vector Machines (SVMs), neural networks (such as deep neural networks and/or recurrent neural networks), decision trees, AdaBoost (short for "Adaptive Boosting") combined with decision trees, and random forests. Focusing on CRF as an example, CRF is a class of statistical models used for structured predictions. In particular, CRFs are a type of discriminative undirected probabilistic graphical models. A CRF can predict a class label for a sample while taking into account contextual information for the sample. CRFs may be used to encode known relationships between observations and construct consistent interpretations. A CRF model may thus be used to label or parse certain sequential data, like query text as described above. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. For example, known types for previous queries may be used as ground truth data for the training set used to train the various components/models. Various techniques may be used to train the models including backpropagation, statistical learning, supervised learning, semi-supervised learning, stochastic learning, stochastic gradient descent, or other known techniques. Thus, many different training examples may be used to train the classifier(s)/model(s) discussed herein. Further, as training data is added to, or otherwise changed, new classifiers/models may be trained to update the classifiers/models as desired.

The anaphora resolver 710 may thus associate a word in an utterance with an entity from a previous utterance, media content, or otherwise, using a combination of potential techniques. As part of the determination of which entity to associate with a word, the anaphora resolver 710 may also rank the possible entities to determine which of the various choices is the appropriate entity to match with the ambiguous word(s) and thus complete the population of the post-NLU fields.

The anaphora resolver 710 may consider data representing a number of different features to determine which entity should be matched with this word. The context data 604, other data 791, information from the knowledge base 272, user profile 404, NLU data 702, may include any of the data discussed above, which may be considered when determining the appropriate entity.

Once an entity has been identified as corresponding to the word(s) of the incoming utterance, the anaphora resolver 710 may output an indicator of the entity (such as an entity ID) in a format useful by a downstream component. For example, the anaphora resolver 710 may insert the entity ID into the N-best list that was input as part of the data 702. For example, if the anaphora resolver 710 determines that the word "she" in the above example corresponds to "Michelle Obama" it may revise the input N-best list to include the entity ID for Michelle Obama and may output a revised N-best list 720 in the form of:

[0.95] GetAge Entity: [Michelle Obama]

[0.05] GetAge Entity: [Cher]

The output data 720 from the anaphora resolver 710 may be sent to a downstream component such as the entity resolver 370, final ranker 390, command processor 290 (which may be a command processor 290 corresponding to the intent of the utterance), or other component that may process or manage the resolved entity data for ultimate command execution.

Figure 8:
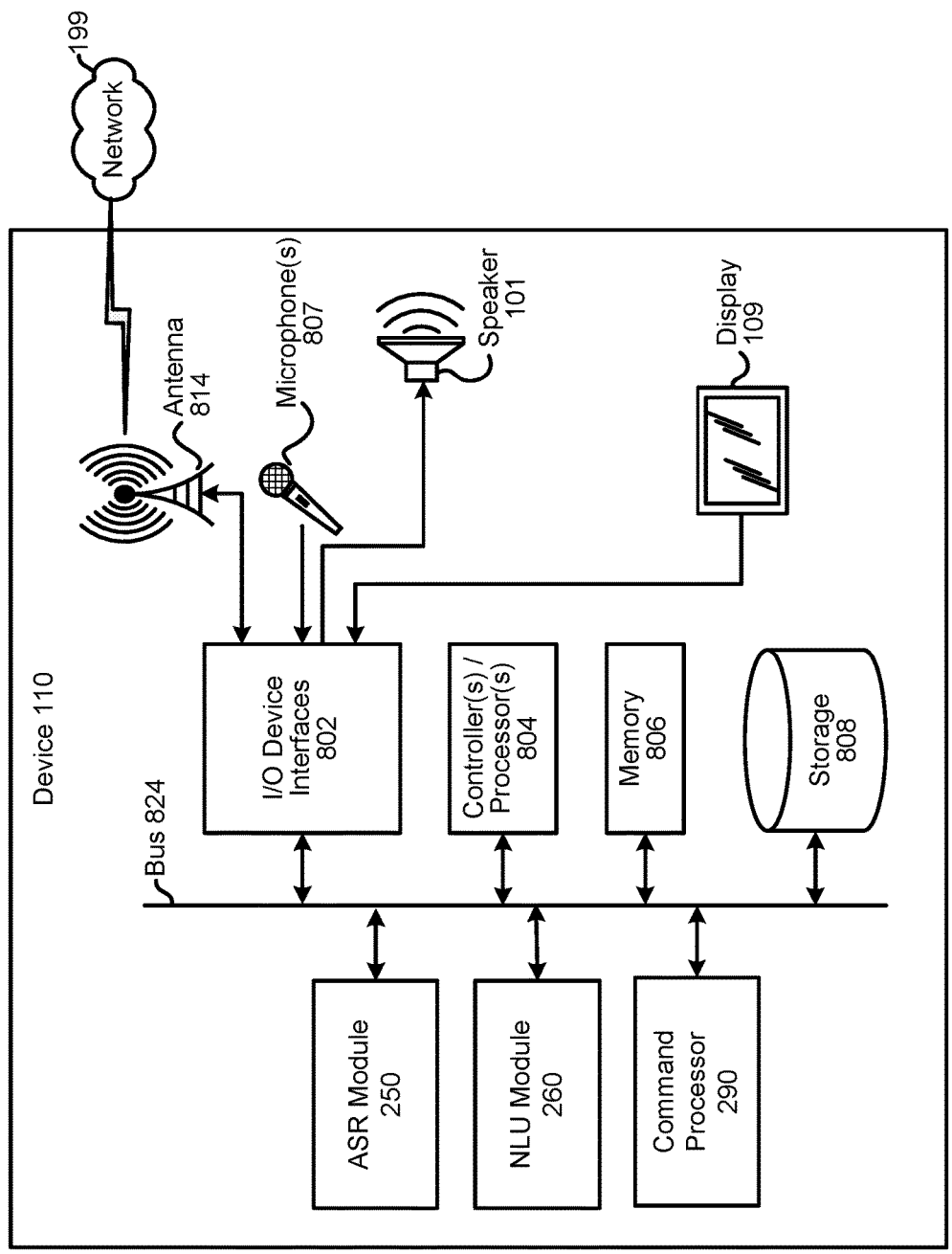
FIG. 8 is a block diagram conceptually illustrating example components of a device according to embodiments of the present disclosure.
Figure 9:
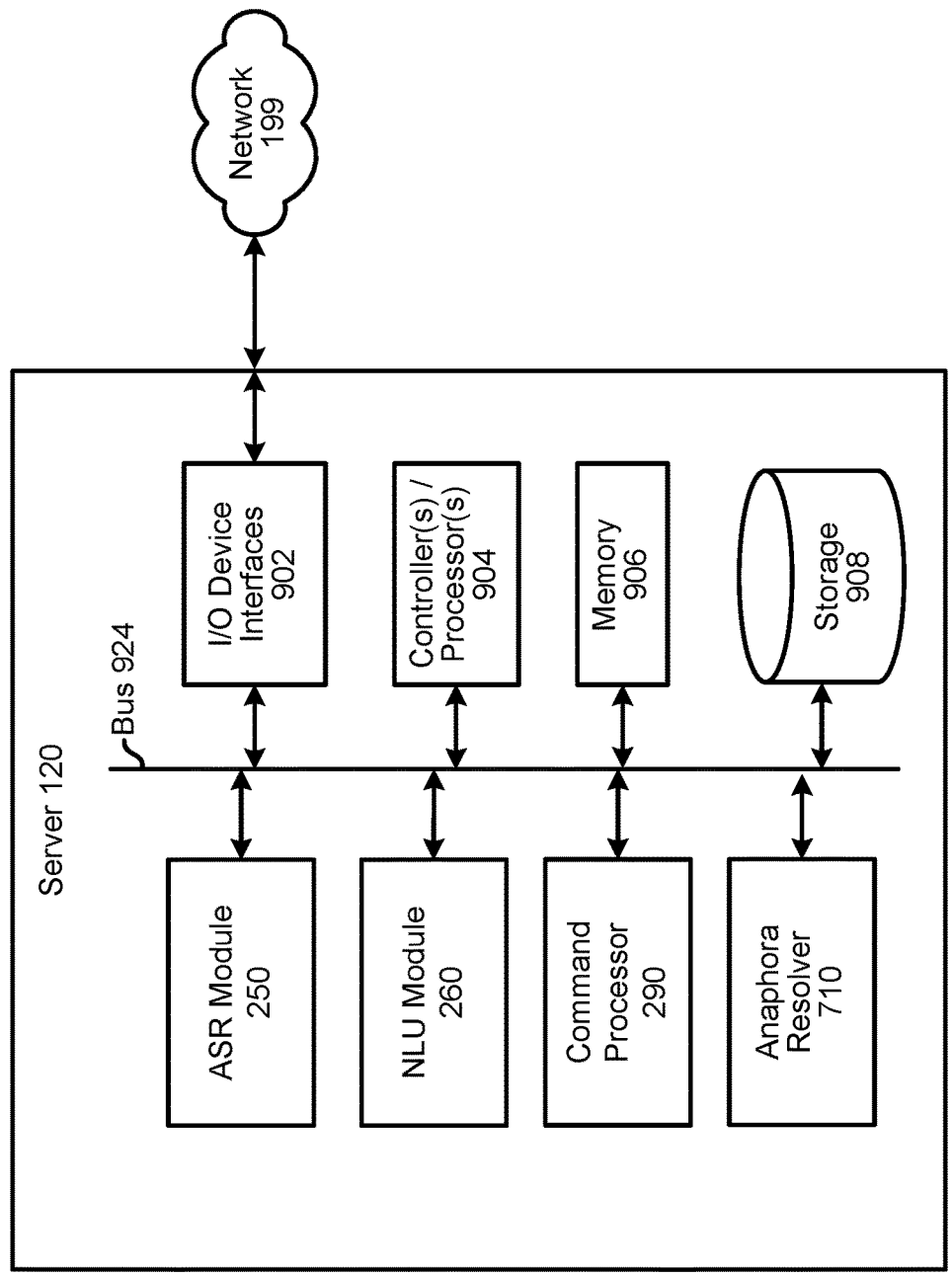
FIG. 9 is a block diagram conceptually illustrating example components of a server according to embodiments of the present disclosure.

FIG. 8 is a block diagram conceptually illustrating a user device 110 (e.g., the speech-controlled device 110 described herein) that may be used with the described system. FIG. 9 is a block diagram conceptually illustrating example components of a remote device, such as the server 120 that may assist with ASR processing, NLU processing, or command processing. Multiple servers 120 may be included in the system 100, such as one server 120 for performing ASR, one server 120 for performing NLU, etc. In operation, each of these devices (or groups of devices) may include computer-readable and computer-executable instructions that reside on the respective device (110/120), as will be discussed further below.

Each of these devices (110/120) may include one or more controllers/processors (804/904), that may each include a central processing unit (CPU) for processing data and computer-readable instructions, and a memory (806/906) for storing data and instructions of the respective device. The memories (806/906) may individually include volatile random access memory (RAM), non-volatile read only memory (ROM), non-volatile magnetoresistive (MRAM) and/or other types of memory. Each device (110/120) may also include a data storage component (808/908), for storing data and controller/processor-executable instructions. Each data storage component may individually include one or more non-volatile storage types such as magnetic storage, optical storage, solid-state storage, etc. Each device (110/120) may also be connected to removable or external non-volatile memory and/or storage (such as a removable memory card, memory key drive, networked storage, etc.) through respective input/output device interfaces (802/902).

Computer instructions for operating each device (110/120) and its various components may be executed by the respective device's controller(s)/processor(s) (804/904), using the memory (806/906) as temporary "working" storage at runtime. A device's computer instructions may be stored in a non-transitory manner in non-volatile memory (806/906), storage (808/908), or an external device(s). Alternatively, some or all of the executable instructions may be embedded in hardware or firmware on the respective device in addition to or instead of software.

Each device (110/120) includes input/output device interfaces (802/902). A variety of components may be connected through the input/output device interfaces (802/902), as will be discussed further below. Additionally, each device (110/120) may include an address/data bus (824/924) for conveying data among components of the respective device. Each component within a device (110/120) may also be directly connected to other components in addition to (or instead of) being connected to other components across the bus (824/924).

Referring to FIG. 8, the device 110 may include input/output device interfaces 802 that connect to a variety of components such as an audio output component such as a speaker 101, a visual output component such as a display 109, a wired headset or a wireless headset (not illustrated), or other component capable of outputting audio. The display 109 may output image and/or video data as described herein. The device 110 may also include an audio capture component. The audio capture component may be, for example, a microphone 807 or array of microphones, a wired headset or a wireless headset (not illustrated), etc. The microphone 807 may be configured to capture audio. If an array of microphones is included, approximate distance to a sound's point of origin may be determined by acoustic localization based on time and amplitude differences between sounds captured by different microphones of the array.

For example, via antenna(s) 814, the input/output device interfaces 802 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, etc. A wired connection such as Ethernet may also be supported. Through the network(s) 199, the speech processing system may be distributed across a networked environment.

The device 110 and/or the server 120 may include an ASR module 250. The ASR module 250 in the device 110 may be of limited or extended capabilities. The ASR module 250 may include the language models 254 stored in ASR model storage component 252. If limited speech recognition is included, the ASR module 250 may be configured to identify a limited number of words, whereas extended speech recognition may be configured to recognize a much larger range of words.

The device 110 and/or the server 120 may include a limited or extended NLU module 260. The NLU module 260 in the device 110 may be of limited or extended capabilities. The NLU module 260 may comprise the name entity recognition module 262, the intent classification module 264, and/or other components. The NLU module 260 may also include a stored knowledge base and/or entity library, or those storages may be separately located.

The device 110 and/or server 120 may include an anaphora resolver 710 which may control a variety of entity identification, as described above.

The device 110 and/or the server 120 may also include the command processor 290 configured to execute commands/functions associated with a spoken utterance as described herein.

To create output speech, the server 120 may be configured with the TTS module 414 described in detail herein above.

As noted above, multiple devices may be employed in a single speech processing system. In such a multi-device system, each of the devices may include different components for performing different aspects of the speech processing. The multiple devices may include overlapping components. The components of the device 110 and the server 120, as illustrated in FIGS. 8 and 9, are exemplary, and may be located as a stand-alone device or may be included, in whole or in part, as a component of a larger device or system.

Figure 10:
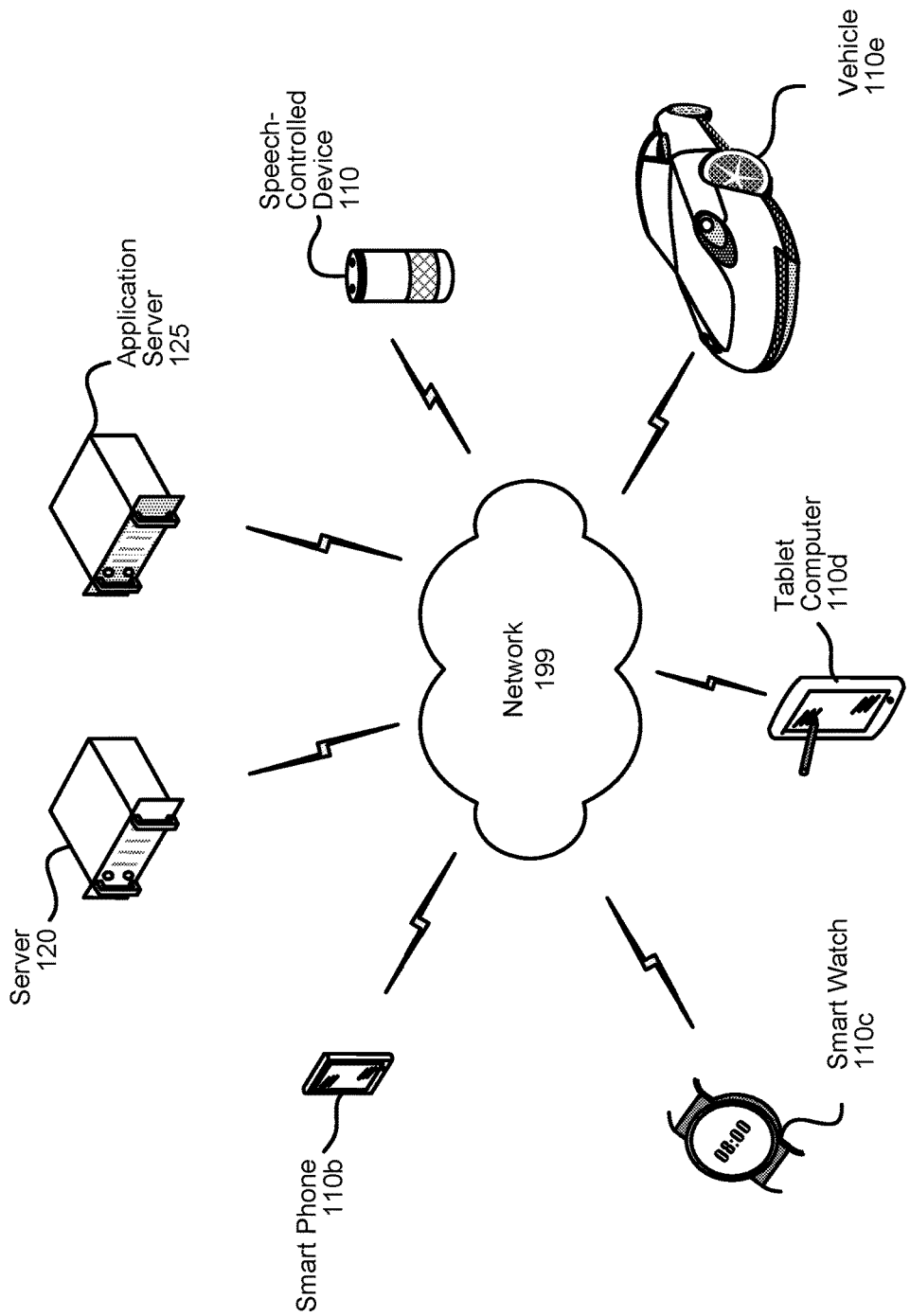
FIG. 10 illustrates an example of a computer network for use with the system.

As illustrated in FIG. 10, multiple devices (120, 110, 110b-110e) may contain components of the system 100 and the devices may be connected over a network 199. The network 199 may include a local or private network or may include a wide network such as the Internet. Devices may be connected to the network 199 through either wired or wireless connections. For example, the speech-controlled device 110, a tablet computer 110d, a smart phone 110b, a smart watch 110c, and/or a vehicle 110e may be connected to the network 199 through a wireless service provider, over a WiFi or cellular network connection, or the like. Other devices are included as network-connected support devices, such as the server 120, application developer devices (e.g., the application server 125), or others. The support devices may connect to the network 199 through a wired connection or wireless connection. Networked devices may capture audio using one-or-more built-in or connected microphones 807 or audio capture devices, with processing performed by ASR, NLU, or other components of the same device or another device connected via the network 199, such as the ASR module 250, the NLU module 260, etc. of one or more servers 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of one or more of the modules and engines may be implemented as in firmware or hardware, such as the AFE 256, which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
   receiving, at a first time and from a first speech-controlled device, first input audio data corresponding to a first utterance;
   processing the first input audio data to determine that the first utterance was spoken by a first speaker;
   performing automatic speech recognition on the first input audio data to obtain first text data;
   processing the first text data to determine that the first text data includes a name of a first person;
   storing association data associating between a first speaker identifier (ID) associated with the first speaker, a first device ID associated with the first speech-controlled device, and a first entity ID associated with the first person;
   receiving, at a second time after the first time and from a second speech-controlled device, second input audio data corresponding to a second utterance;
   processing the second input audio data to determine that the second utterance was spoken by the first speaker;
   associating the second input audio data with the first speaker ID;
   performing automatic speech recognition on the second input audio data to obtain second text data;
   determining that the second text data includes a pronoun that refers to an entity that is not named in the second text data;
   identifying the association data using the first speaker ID;
   determining that the association data associates the first speaker ID and the first entity ID;
   determining a length of time between the first time and the second time;
   determining, based on the length of time, a score corresponding to a likelihood of the pronoun referring to the first person;
   determining the score is within a threshold;
   in response to determining that the score is within the threshold, associating the first entity ID with the pronoun; and
   causing a command to be executed using the first entity ID and the second text data, wherein the pronoun is replaced by the name of the first person in the second text data.

2. The computer-implemented method of claim 1, further comprising:
   determining that the first person is female;
   determining that the pronoun is a female pronoun; and
   determining the score based at least in part on the first person being female.

3. The computer-implemented method of claim 1, further comprising:
   determining, using the second text data, a first data structure comprising a first indicator of an intent of the second utterance and a second indicator of the pronoun;
   after associating the first entity ID with the second text data, determining a second data structure comprising the first indicator and the first entity ID; and
   sending the second data structure to a component to cause the command to be executed.

4. The computer-implemented method of claim 1, further comprising:
   determining a distance between the first speech-controlled device and the second speech-controlled device, and
   wherein determining the score is based on the distance.

5. A system comprising:
   at least one processor; and
   memory storing instructions operable to be executed by the at least one processor to perform a set of actions to configure the at least one processor to:
   receive, at a first time, from a first device corresponding to a first device identifier (ID), audio data corresponding to an utterance;
   determine that the utterance was spoken by a first speaker corresponding to a first speaker ID;
   process the audio data to determine text data corresponding to the utterance;
   identify a word in the text data corresponding to an entity not named in the utterance;
   identify stored data corresponding to a previous utterance associated with a second speaker ID and a second device ID, the previous utterance spoken at a second time prior to the first time and including at least an entity name;
   determine that a length of time between the first time and the second time is within a threshold time length;

determine an association among at least one of the first device ID or the first speaker, and at least one of the second device ID or the second speaker ID;

based on the length of time being within the threshold time length and the association, associate the word with the entity name in the previous utterance; and cause a command to be executed using the entity name and the text data.

6. The system of claim 5, wherein the memory further comprises instructions that further configure the at least one processor to:

determine that the stored data includes an association between the previous utterance and the first device ID.

7. The system of claim 5, wherein the memory further comprises instructions that further configure the at least one processor to:

determine that the stored data includes an association between the previous utterance and the first speaker ID.

8. The system of claim 5, wherein the memory further comprises instructions that further configure the at least one processor to:

determine that the stored data includes an association between the previous utterance and the second speaker ID associated with a second speaker different from the first speaker.

9. The system of claim 5, wherein the memory further comprises instructions that further configure the at least one processor to:

determine that the first device ID is associated with a first location;

determine that the second device ID is associated with a second location;

determine that a distance between the first location and the second location is within a threshold distance; and associate the word with the entity name in the previous utterance based on the distance being within the threshold distance.

10. The system of claim 5, wherein the memory further comprises instructions that further configure the at least one processor to:

determine that the first device ID is associated with a first user account; and determine that the second device ID is associated with the first user account.

11. The system of claim 5, wherein the instructions that configure the at least one processor to process the stored data using the first device ID and the first speaker ID to identify the entity comprise instructions that configure the at least one processor to process the stored data, the first device ID and the first speaker ID using a trained model to identify the entity.

12. The system of claim 5, wherein the instructions that determine that the utterance was spoken by a first speaker further configure the at least one processor to:

process the audio data to determine a correspondence between the audio data and stored data corresponding to the first speaker.

13. A computer-implemented method comprising:

receiving, from a first device corresponding to a first device identifier (ID) and a first location, audio data corresponding to an utterance;

determining that the utterance was spoken by a first speaker corresponding to a first speaker ID;

processing the audio data to determine text data corresponding to the utterance;

identifying a word in the text data corresponding to an entity not named in the utterance;

identifying stored data corresponding to a previous utterance associated with a second speaker ID, a second device ID and a second location, the previous utterance including at least an entity name;

determining that a distance between the first location and the second location is within a threshold distance;

determining an association among at least one of the first device ID or the first speaker ID, and at least one of the second device ID or the second speaker ID; and based on the distance being within the threshold distance and the association, associating the word with the entity name in the previous utterance.

14. The computer-implemented method of claim 13, further comprising:

determining that the stored data includes an association between the previous utterance and at least one of the first device ID or the first speaker ID.

15. The computer-implemented method of claim 13, further comprising:

determining that the stored data includes an association between the previous utterance and the second speaker ID associated with a second speaker different from the first speaker.

16. The computer-implemented method of claim 13, further comprising:

determining that the utterance corresponds to a first time;

determining that the previous utterance corresponds to a second time;

determining that a length of time between the first time and the second time is below a threshold time length; and associating the word with the entity name in the previous utterance based on the length of time being below the threshold time length.

17. The computer-implemented method of claim 13, further comprising:

determining that the first device ID is associated with a first user account; and determining that the second device ID is associated with the first user account.

18. The computer-implemented method of claim 13, wherein processing the stored data using the first device ID and the first speaker ID to identify the entity comprises processing the stored data, the first device ID and the first speaker ID using a trained model to identify the entity.

19. The computer-implemented method of claim 13, wherein determining that the utterance was spoken by a first speaker comprises processing the audio data to determine a correspondence between the audio data and stored data corresponding to the first speaker.

* * * * *